(12) United States Patent
Ueno et al.

(10) Patent No.: US 9,658,855 B2
(45) Date of Patent: May 23, 2017

(54) COMPILE METHOD AND COMPILER APPARATUS

(71) Applicant: FUJITSU LIMITED, Kawasaki-shi, Kanagawa (JP)

(72) Inventors: Masakazu Ueno, Numazu (JP); Masahiro Doteguchi, Mountain View, CA (US)

(73) Assignee: FUJITSU LIMITED, Kawasaki (JP)

( * ) Notice: Subject to any disclaimer, the term of this patent is extended or adjusted under 35 U.S.C. 154(b) by 274 days.

(21) Appl. No.: 14/511,251

(22) Filed: Oct. 10, 2014

(65) Prior Publication Data
US 2016/0103683 A1    Apr. 14, 2016

(51) Int. Cl.
| | |
|---|---|
| G06F 9/44 | (2006.01) |
| G06F 9/00 | (2006.01) |
| G06F 9/38 | (2006.01) |
| G06F 9/45 | (2006.01) |

(52) U.S. Cl.
CPC .............. *G06F 9/3844* (2013.01); *G06F 8/41* (2013.01); *G06F 9/3851* (2013.01)

(58) Field of Classification Search
None
See application file for complete search history.

(56) References Cited

U.S. PATENT DOCUMENTS

| | | | |
|---|---|---|---|
| 7,664,942 B1 * | 2/2010 | Tremblay .............. | G06F 9/3804 712/207 |
| 8,667,476 B1 * | 3/2014 | Jung ................... | G06F 9/30145 717/140 |
| 2002/0052926 A1 * | 5/2002 | Bush ....................... | G06F 8/458 709/217 |
| 2003/0135718 A1 * | 7/2003 | DeWitt, Jr. ......... | G06F 11/3636 712/227 |
| 2003/0135719 A1 * | 7/2003 | DeWitt, Jr. ............. | G06F 11/28 712/227 |
| 2004/0049667 A1 * | 3/2004 | McCormick, Jr. ...... | G06F 9/322 712/233 |
| 2004/0215720 A1 | 10/2004 | Alexander et al. | |
| 2006/0026411 A1 | 2/2006 | Yoshida | |

(Continued)

FOREIGN PATENT DOCUMENTS

| | | |
|---|---|---|
| JP | 2000-148696 | 5/2000 |
| JP | 2004-326785 | 11/2004 |

(Continued)

OTHER PUBLICATIONS

Patent Abstracts of Japan, Publication No. 2000-148696, published May 30, 2000.

(Continued)

*Primary Examiner* — Michael Sun
(74) *Attorney, Agent, or Firm* — Staas & Halsey LLP

(57) ABSTRACT

A compiler apparatus copies a branch instruction included in first code to produce a plurality of branch instructions. The compiler apparatus generates a control instruction to cause different threads running on a processor, which is able to execute a plurality of threads that share storage space for storing information to be used for branch prediction, to execute different ones of the plurality of branch instructions. The compiler apparatus generates second code including the plurality of branch instructions and the control instruction.

6 Claims, 19 Drawing Sheets

(56) References Cited

U.S. PATENT DOCUMENTS

| | | | |
|---|---|---|---|
| 2009/0055630 A1 | 2/2009 | Isshiki et al. | |
| 2010/0275213 A1 | 10/2010 | Sakai | |
| 2011/0119660 A1* | 5/2011 | Tanaka | G06F 8/4441 717/149 |
| 2015/0378739 A1* | 12/2015 | Gschwind | G06F 9/3861 712/225 |

FOREIGN PATENT DOCUMENTS

| | | |
|---|---|---|
| JP | 2006-40142 | 2/2006 |
| JP | 2007-193430 | 8/2007 |
| JP | 2010-257428 | 11/2010 |

OTHER PUBLICATIONS

Patent Abstracts of Japan, Publication No. 2004-326785, published Nov. 18, 2004.
Patent Abstracts of Japan, Publication No. 2006-040142, published Feb. 9, 2006.
Patent Abstracts of Japan, Publication No. 2007-193430, published Aug. 2, 2007.
Patent Abstracts of Japan, Publication No. 2010-257428, published Nov. 11, 2010.

* cited by examiner

SOURCE CODE      141

```
void sub_child( ) {
    ...
    for (i = 1; i < n; i++) {
    for (j = 1; j < m; j++) {
        if (ch == A) {
            /* OPERATION 1 */
        } else if (ch == B) {
            /* OPERATION 2 */
        } else {
            /* OPERATION 3 */
        }
    }}
}
void sub_parent( ) {
    ...
    for (k = 1; k < max; k++) {
        sub_child( );
    }
}
```

FIG. 8

SOURCE CODE  — 142

```
void sub_child( ) {
    ...
    for (i = 1; i < n; i++) {
    for (j = 1; j < m; j++) {
        switch (ch) {
            case A:
                /* OPERATION 1 */
                break;
            case B:
                /* OPERATION 2 */
                break;
            default:
                /* OPERATION 3 */
                break;
        }
    }}
}
void sub_parent( ) {
    ...
    for (k = 1; k < max; k++) {
        sub_child( );
    }
}
```

FIG. 9

COMPILE COMMAND (FIRST PHASE)　　　　　　　　　143

```
$ cc -OPTprofile:collect: [OUTPUT DESTINATION OF
                                      SOFTWARE INFORMATION]
     -OPThw-counter:collect: [OUTPUT DESTINATION OF
                                         HARDWARE INFORMATION]
     [SOURCE FILE NAME] -o [EXECUTE FILE NAME]
```

COMPILE COMMAND (SECOND PHASE)　　　　　　　144

```
$ cc -OPTprofile:use: [INPUT SOURCE OF SOFTWARE
                                 INFORMATION]
     -OPThw-counter:use: [INPUT SOURCE OF HARDWARE
                                    INFORMATION]
     : [COST THRESHOLD]:[MISPREDICTION THRESHOLD]
     [SOURCE FILE NAME] -o [EXECUTE FILE NAME]
```

FIG. 11

124 EXECUTION INFORMATION STORAGE UNIT

SOFTWARE INFORMATION

145
```
--THREAD #1--
[LINE],              [EXECUTION COUNT]
11xxx15,             300
11xxx17,             150
...

[UNIT OF EXECUTION], [EXECUTION COUNT]
1xxx10,              5
11xxx50,             8
...
```

146
```
--THREAD #2--
[LINE],              [EXECUTION COUNT]
11xxx15,             320
11xxx17,             145
...

[UNIT OF EXECUTION], [EXECUTION COUNT]
11xxx10,             4
11xxx50,             10
...
```

HARDWARE INFORMATION

147
```
--THREAD #1--
[INSTRUCTION], [EXECUTION COUNT]
1010xxx01,     300
1010xxx10,     150
...

[INSTRUCTION], [CYCLE COUNT]
1010xxx01,     1500
1010xxx10,     900
...

[BRANCH         [MISPREDICTION
INSTRUCTION],   COUNT]
1010xxx01,      80
1010xxx10,      5
...
```

148
```
--THREAD #2--
[INSTRUCTION], [EXECUTION COUNT]
1010xxx01,     320
1010xxx10,     145
...

[INSTRUCTION], [CYCLE COUNT]
1010xxx01,     1600
1010xxx10,     870
...

[BRANCH         [MISPREDICTION
INSTRUCTION],   COUNT]
1010xxx01,      90
1010xxx10,      4
...
```

FIG. 12

OPTIMIZED CODE  ⸺ 151

```
void sub_child( ) {
    ...
    for (i = 1; i < n; i++) {
    for (j = 1; j < m; j++) {
        goto if_start01+threadID;
if_end01:
        goto end;
if_start01+0:
        if (ch == A) {
            /* OPERATION 1 */
        } else if (ch == B) {
            /* OPERATION 2 */
        } else {
            /* OPERATION 3 */
        }
        goto if_end01;
if_start01+1:
        if (ch == A) {
            /* OPERATION 1 */
        } else if (ch == B) {
            /* OPERATION 2 */
        } else {
            /* OPERATION 3 */
        }
        goto if_end01;
end:
    }}
}
void sub_parent( ) {
    ...
    for (k = 1; k < max; k++) {
        sub_child( );
    }
}
```

151a (top group), 151b (middle group), 151c (bottom group)

FIG. 17

OPTIMIZED CODE　　　　　152

```
void sub_child( ) {
    ...
    for (i = 1; i < n; i++) {                    ⎫
        goto loop_start01+threadID;              ⎬ 152a
loop_end01:                                      ⎪
        goto end;                                ⎭
loop_start01+0:                                  ⎫
        for (j = 1; j < m; j++) {                ⎪
            if (ch == A) {                       ⎪
                /* OPERATION 1 */                ⎪
            } else if (ch == B) {                ⎬ 152b
                /* OPERATION 2 */                ⎪
            } else {                             ⎪
                /* OPERATION 3 */                ⎪
            }                                    ⎪
        }                                        ⎪
        goto loop_end01;                         ⎭
loop_start01+1:                                  ⎫
        for (j = 1; j < m; j++) {                ⎪
            if (ch == A) {                       ⎪
                /* OPERATION 1 */                ⎪
            } else if (ch == B) {                ⎬ 152c
                /* OPERATION 2 */                ⎪
            } else {                             ⎪
                /* OPERATION 3 */                ⎪
            }                                    ⎪
        }                                        ⎪
        goto loop_end01;                         ⎭
end:
    }
}
void sub_parent( ) {
    ...
    for (k = 1; k < max; k++) {
        sub_child( );
    }
}
```

FIG. 18

OPTIMIZED CODE ___ 153

```
void sub_child[0]( ) {
    ...
    for (i = 1; i < n; i++) {
    for (j = 1; j < m; j++) {
        if (ch == A) {
            /* OPERATION 1 */
        } else if (ch == B) {
            /* OPERATION 2 */
        } else {
            /* OPERATION 3 */
        }
    }}
}
void sub_child[1]( ) {
    ...
    for (i = 1; i < n; i++) {
    for (j = 1; j < m; j++) {
        if (ch == A) {
            /* OPERATION 1 */
        } else if (ch == B) {
            /* OPERATION 2 */
        } else {
            /* OPERATION 3 */
        }
    }}
}
void sub_parent( ) {
    ...
    for (k = 1; k < max; k++) {
        sub_child[threadID]( );
    }
}
```

- 153b (sub_child[0])
- 153c (sub_child[1])
- 153a (sub_parent)

FIG. 19

COMPILE METHOD AND COMPILER APPARATUS

FIELD

The embodiments discussed herein relate to a compile method and a compiler apparatus.

BACKGROUND

Pipeline processing is one of the techniques that improve the performance of computer processors. In the pipeline processing, the execution of each instruction is divided into a plurality of stages, such as fetch, decode, execute, memory access, and so on, and different stages of instructions are executed in parallel. That is to say, in parallel with execution of an instruction at a stage (for example, a fetch stage), another instruction at another stage (for example, a decode stage) is executed.

Ideally, it is preferable that instructions are placed in a pipeline such that there are no idle stages. However, some stages become idle due to many reasons, and if this happens, the utilization of the pipeline degrades. One of the reasons is that a program includes branch instructions indicating conditional branches. When the program encounters a branch instruction, it continues to fetch an instruction at the next sequential address without jumping (not-taken) or jumps to fetch an instruction at a remote address (taken), depending on the result of executing the branch instruction. An instruction to be fetched next to the branch instruction is not determined until the branch instruction exits the execute stage. If the next instruction is placed in the pipeline after the completion of the execution of the branch instruction, some stages may become idle.

To deal with this problem, there is an approach that implements branch prediction techniques in a processor. A branch prediction circuit that is provided as hardware in the processor stores history information about previous branch directions of branch instructions. For example, the branch prediction circuit stores a bit sequence indicating several previous branch directions ("taken" or "not-taken") to several tens of previous branch directions, for each branch instruction.

When a branch instruction is placed in a pipeline, the branch prediction circuit predicts a branch direction of this branch instruction on the basis of the history information. For example, in the case where there is a high probability that the same branch direction is selected successively, the branch prediction circuit is able to predict that the next branch direction will be the same as several most recent branch directions. In addition, for example, in the case where a branch is alternately taken and not taken with a pattern, the branch prediction circuit is able to predict the next branch direction of the branch instruction according to the pattern.

Once a branch direction is predicted, the instruction in the predicted branch direction is placed next to the branch instruction in the pipeline (speculative execution). If the predicted branch direction matches an actual branch direction, the processor just continues to perform the pipeline processing. If the predicted branch direction is incorrect, on the contrary, the processor removes the instruction placed based on the prediction from the pipeline and places an appropriate instruction. This is a misprediction penalty. Therefore, it may be said that the efficiency of the pipeline processing depends on the accuracy of the branch prediction.

In addition, there is hardware multithreading as another of the techniques that improve the performance of processors. While the instruction sequence of a single thread is executed, a small waiting time may intermittently occur due to various reasons, such as memory access, other than the above-described conditional branches. In Operating System (OS)-level multithreading that involves context switches, such as replacement of register data, it is difficult to reduce the intermittent small waiting time. Therefore, in the situation where a single processor or processor core executes only a single thread at a time, there is a limit on the improvement of the utilization of resources including the pipeline stages and others.

The hardware multithreading enables a plurality of threads to share the resources of a single processor or processor core at the same time. From the processor's standpoint, such threads may be called "hardware threads". The processor stores data for the plurality of hardware threads in a register of the processor. If a waiting time for a hardware thread occurs, for example, the processor places instructions from another hardware thread in the pipeline to keep the stages of the pipeline busy in the waiting time. In this case, the instructions from the hardware thread and the instructions from the other hardware thread coexist in the pipeline and are executed in parallel. Since context switches are not involved, it is possible to switch between the hardware threads at a high speed.

An OS recognizes that a plurality of threads is executed physically in parallel on this processor or processor core. Therefore, from the OS standpoint, the single processor or processor core that executes the plurality of hardware threads logically appears to be as many processors or processor cores as the number of hardware threads.

By the way, there is an idea that both the hardware multithreading and the branch prediction are implemented in a processor. In such a processor, a plurality of hardware threads may share a branch prediction circuit that stores history information on branch instructions, as one of resources provided in the processor or processor core. The history information may be stored in tabular form. For example, when a branch instruction is executed by one of the plurality of hardware threads, the branch prediction circuit converts the address of the branch instruction into an index of the table with a hash function or another algorithm and updates the entry indicated by the index.

There is the following technique proposed for sharing a branch prediction circuit among threads. While the same code is executed by two threads, a processor operates in a "unified mode" in which all the indexes of a table are shared. While different codes are executed by two threads, on the other hand, the processor operates in a "split mode" in which one table is split into halves, and a half of the indexes are allocated to one thread and the other half are allocated to the other thread. In the split mode, an index of the table is calculated from the address of a branch instruction such that the most significant bit corresponds to a thread identifier, thereby splitting the table into halves. This usage of the table is implemented as hardware in the processor.

Please see, for example, Japanese Laid-open Patent Publication No. 2004-326785.

In a processor that is able to execute a plurality of threads, the plurality of threads may start to run under the same program. This case has a problem on how to share storage space for storing information to be used for branch prediction (for example, storage space for storing a table).

When a branch instruction is executed by one thread, the result of executing the branch instruction (for example, a bit indicating "taken" or "not-taken") is written to the space corresponding to the address of the branch instruction or the like. Likewise, when a branch instruction is executed by another thread, the result of executing the branch instruction is written to the space corresponding to the address of the branch instruction or the like. At this time, since these two threads execute the same program, there is a possibility that these two branch instructions are the same instructions (i.e., have the same instruction address). If so, the same information is updated by the two threads, and therefore both the execution results obtained by the two threads are included in the information.

Branch prediction based on information including all execution results obtained by a plurality of threads has a problem of degrading the accuracy of the branch prediction. For example, in the case where the previous branch directions of a branch instruction were "taken" several times in a row in one thread, it is predictable for the thread that the next branch direction of the branch instruction will be "taken". In addition, in the case where the previous branch directions of the branch instruction were "not-taken" several times in a row in another thread, it is predictable for the other thread that the next branch direction of the branch instruction will be "not-taken". However, using information that includes both "taken" and "not-taken" obtained by the two threads makes it difficult to perform such branch prediction.

To deal with this problem, there is an approach that improves the branch prediction circuit in terms of hardware and allocates different storage space to two threads that start to run under the same program. This approach, however, fails to increase the branch prediction accuracy of existing processors.

SUMMARY

According to one aspect, there is provided a non-transitory computer-readable storage medium storing a computer program that causes a computer to perform a process including: copying a branch instruction included in first code to produce a plurality of branch instructions; generating a control instruction to cause different threads running on a processor to execute different branch instructions of the plurality of branch instructions, the processor being able to execute a plurality of threads that share storage space for storing information to be used for branch prediction; and generating second code including the plurality of branch instructions and the control instruction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of source code;
FIG. 9 illustrates another example of source code;
FIG. 11 illustrates an example of compile commands;
FIG. 12 illustrates an example of collected execution information;
FIG. 17 illustrates a first example of optimized code;
FIG. 18 illustrates a second example of optimized code;
and
FIG. 19 illustrates a third example of optimized code.

DESCRIPTION OF EMBODIMENTS

Figure 1:
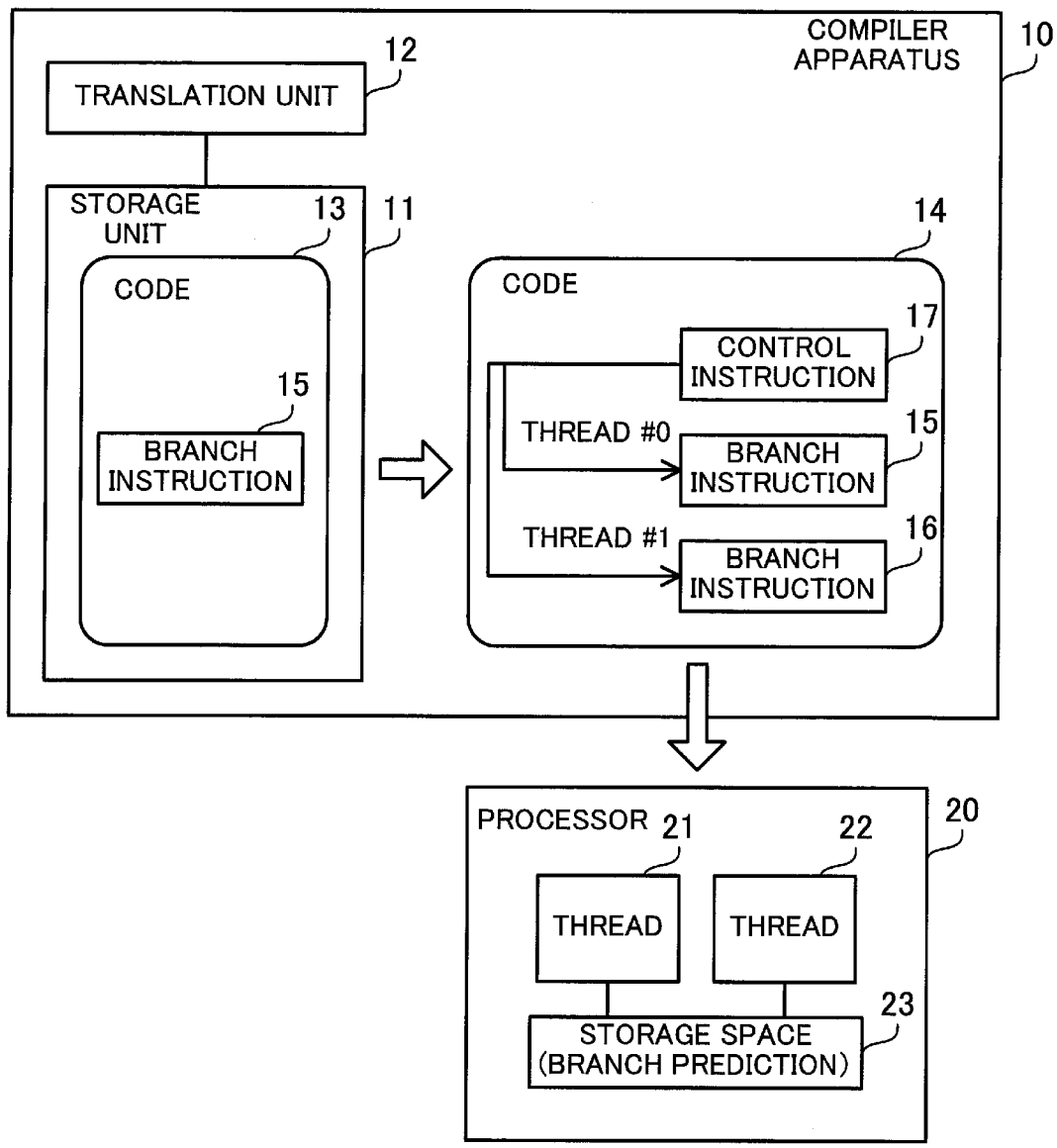
FIG. 1 illustrates an example of a compiler apparatus according to a first embodiment.

Several embodiments will be described below with reference to the accompanying drawings, wherein like reference numerals refer to like elements throughout.

First Embodiment

FIG. 1 illustrates an example of a compiler apparatus according to a first embodiment.

A compiler apparatus 10 of the first embodiment optimizes code, expecting that the code will be executed by a processor 20 or a processor having equivalent architecture to the processor 20. The compiler apparatus 10 translates code 13 into code 14. Each code 13 and 14 includes a set of instructions. The code 13 is, for example, source code written in high level language or intermediate code into which source code is translated. The code is, for example, optimized intermediate code, assembly code, machine-readable object code, or another.

The compiler apparatus 10 may be a terminal device that is operated by a user or may be a server apparatus that the terminal device accesses. In addition, the compiler apparatus 10 may be implemented using a computer or an information processing apparatus. The processor 20 may be provided in the compiler apparatus 10 or another computer. That is to say, object code generated by the compiler apparatus may be executed by the compiler apparatus 10 or another computer.

The compiler apparatus 10 includes a storage unit 11 and a translation unit 12. The storage unit 11 stores the code 13. The storage unit 11 may be a volatile storage device, such as a Random Access Memory (RAM), or a non-volatile storage device, such as a Hard Disk Drive (HDD). The translation unit 12 translates the code 13 stored in the storage unit 11 into the code 14. The translation unit 12 may be a processor, such as a Central Processing Unit (CPU), Digital Signal Processor (DSP), etc., an application-specific electronic circuit, such as an Application Specific Integrated Circuit (ASIC), a Field Programmable Gate Array (FPGA), etc. The processor executes a program stored in the storage unit 11 or another storage device, for example. In this connection, a set of a plurality of processors (multiprocessor) may be called "a processor".

The processor 20 implements hardware multithreading and branch prediction techniques. The processor 20 includes a thread 21 (thread #0), a thread 22 (thread #1), and storage space 23. In the case where the processor 20 is a multicore processor, the threads 21 and 22 and the storage space 23 may belong to the same core.

The threads 21 and 22 may be called hardware threads. The threads 21 and 22 share resources, such as pipeline stages, operation unit, etc., provided in the processor 20. While one of the threads 21 and 22 executes, some resources become idle. Then, the other of the threads 21 and 22 uses the idle resources, so that the threads 21 and 22 run in parallel. For example, the processor 20 allocates a register to both the threads 21 and 22. When a waiting time occurs in the thread 21, instructions from the thread 22 are issued to the pipeline to fill the idle stages. In addition, for example, in the case where the processor 20 is provided with an integer arithmetic unit and a floating point arithmetic unit, which are able to operate in parallel, the processor 20 is able to perform a floating point arithmetic operation of the thread 22 while performing an integer arithmetic operation of the thread 21.

The storage space 23 stores information to be used for branch prediction. The storage space 23 may be storage space of a semiconductor memory provided in a branch prediction circuit. For example, the storage space 23 stores history information indicating a predetermined number of previous branch directions (taken or not-taken) in association with the address of a branch instruction or an index calculated from the address of the branch instruction. The information to be used for the branch prediction may be stored in tabular form.

The translation unit 12 generates the code 14 from the code 13 in the following manner.

In order to optimize branch prediction for a branch instruction 15 indicating a conditional branch, included in the code 13, the translation unit 12 copies the branch instruction 15 so as to produce a plurality of branch instructions indicating the conditional branch corresponding to the branch instruction 15 (generally, the same conditional branch as the branch instruction 15). Referring to FIG. 1, the branch instructions 15 and 16 are generated. The number of branch instructions existing after the copy may be the same as or different from the number of threads running on the processor 20.

In addition, in the case of causing the processor 20 to execute the code 14 or object code obtained by translating the code 14, the translation unit 12 generates a control instruction 17 for causing different threads to execute different ones of the branch instructions 15 and 16. For example, the control instruction 17 is to confirm a thread ID, and to select the branch instruction 15 or an instruction group including the branch instruction 15 in the case of a thread #0 or to select the branch instruction 16 or an instruction group including the branch instruction 16 in the case of a thread #1. This means that, when the code starts executing on the tread 21, the branch instruction 15 is executed, whereas the branch instruction 16 is not executed. When the code starts executing on the tread 22, on the other hand, the branch instruction 16 is executed, whereas the branch instruction 15 is not executed.

Then, the translation unit 12 generates the code 14 including the branch instructions 15 and 16 and the control instruction 17. In the case where the code 14 is intermediate code or assembly code, the code 14 is translated into object code that is executable by the processor 20.

When the code 14 or object code obtained by translating the code 14 is executed by both the threads 21 and 22, the branch instruction 15 of the branch instructions 15 and 16 is executed by the thread 21. Then, for example, the result of executing the branch instruction 15 is written to the space corresponding to the instruction address of the branch instruction 15 in the storage space 23. On the other hand, the branch instruction 16 of the branch instructions 15 and 16 is executed by the thread 22. Then, for example, the result of executing the branch instruction 16 is written to the space corresponding to the instruction address of the branch instruction 16 in the storage space 23.

In the above-described branch prediction optimization, the compiler apparatus 10 of the first embodiment copies the branch instruction 15 included in the code 13, and generates the code 14 for causing different threads to execute different ones of the branch instructions 15 and 16. Therefore, even when the same object code is executed by the threads 21 and 22, the branch instructions at different addresses are executed by these threads. This increases the probability that information to be used in branch prediction for the thread 21 and information to be used in branch prediction for the thread 22 are written to different spaces in the storage space 23, thus obviating the need to modify the branch prediction circuit. In addition, it is possible to perform the branch prediction for the threads 21 and separately, thus increasing the branch prediction accuracy.

Second Embodiment

A compiler apparatus 100 of a second embodiment compiles source code written in high level language into computer-readable object code. The compiler apparatus 100 may be a terminal device that is operated by a user or a server apparatus that the terminal device accesses. The compiler apparatus 100 is implemented using a computer, for example. In this case, the compiler apparatus 100 executes a compiler that is implemented as software.

Figure 2:
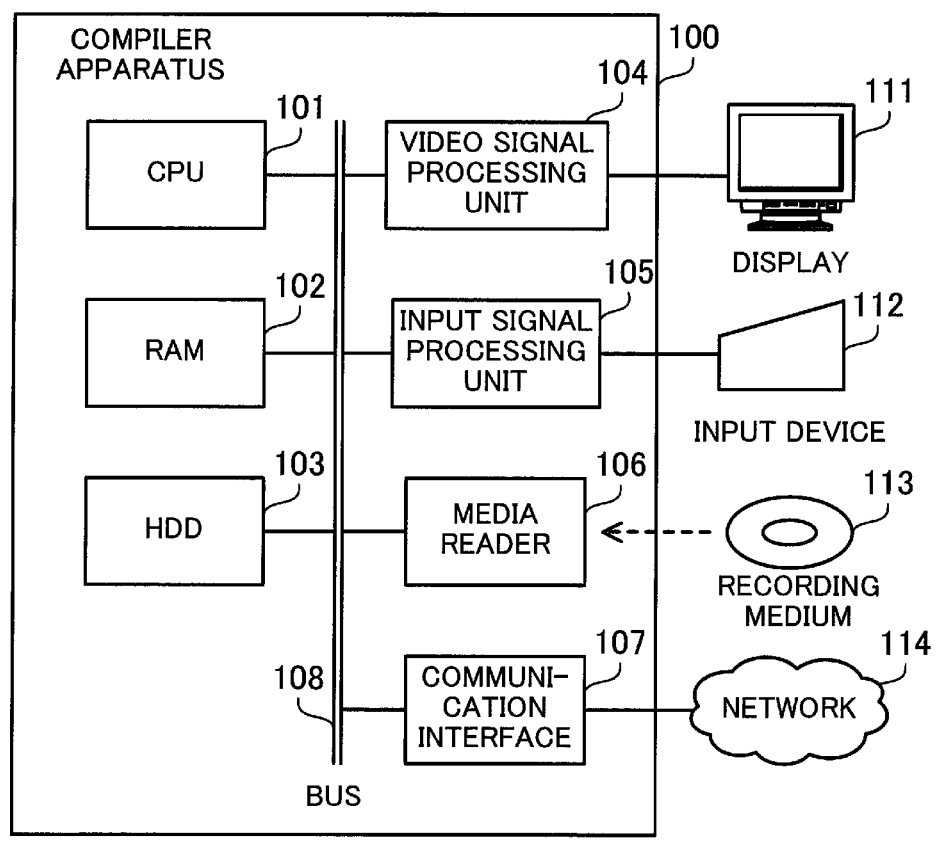
FIG. 2 is a block diagram illustrating an example of a hardware configuration of a compiler apparatus.

FIG. 2 is a block diagram illustrating an example of a hardware configuration of a compiler apparatus.

The compiler apparatus 100 includes a CPU 101, a RAM 102, an HDD 103, a video signal processing unit 104, an input signal processing unit 105, a media reader 106, and a communication interface 107. These units are connected to a bus 108. The CPU 101 is one example of the translation unit 12 of the first embodiment, and the RAM 102 is one example of the storage unit 11 of the first embodiment.

The CPU 101 is a processor including an operation circuit that executes program instructions. The CPU 101 loads at least part of programs and data from the HDD 103 to the RAM 102, and executes the programs. In this connection, the CPU 101 may be provided with a plurality of processor cores, and the compiler apparatus 100 may be provided with a plurality of processors, so that the compiler apparatus 100 performs operations in parallel using the plurality of processors or processor cores, as will be described later. In addition, a set of a plurality of processors (multiprocessor) may be called "a processor".

The RAM 102 is a volatile semiconductor memory that temporarily stores programs to be executed by the CPU 101 and data to be used in operations of the CPU 101. In this connection, the compiler apparatus 100 may be provided with another kind of memory other than RAM or with a plurality of memories.

The HDD 103 is a non-volatile storage device that stores software programs, such as OS, middleware, application software programs, and data. The programs stored in the HDD 103 include a compiler program. In this connection, the compiler apparatus 100 may be provided with another kind of storage device, such as a flash memory, a Solid State Drive (SSD), etc., or with a plurality of non-volatile storage devices.

The video signal processing unit 104 outputs images to a display 111 connected to the compiler apparatus 100 in accordance with instructions from the CPU 101. As the display 111, a Cathode Ray Tube (CRT) display, a Liquid Crystal Display (LCD), a Plasma Display Panel (PDP), an Organic Electro-Luminescence (OEL) display, or another may be used.

The input signal processing unit 105 receives an input signal from an input device 112 connected to the compiler apparatus 100, and outputs the input signal to the CPU 101. As the input device 112, a pointing device, such as a mouse, a touch panel, a touchpad, a trackball, etc., a keyboard, a remote controller, a button switch, or another may be used. Furthermore, plural kinds of input devices may be connected to the compiler apparatus 100.

The media reader 106 reads programs and data from a recording medium 113. As the recording medium 113, for example, a magnetic disk, such as a Flexible Disk (FD), an HDD, etc., an optical disc, such as a Compact Disc (CD), a Digital Versatile Disc (DVD), etc., an Magneto-Optical disk (MO), a semiconductor memory, or another may be used. For example, the media reader 106 reads programs and data read from the recording medium 113 and stores them in the RAM 102 or the HDD 103.

The communication interface 107 is connected to a network 114, and performs communication with another computer over the network 114. The communication interface 107 may be a wired communication interface connected to a communication device, such as a switch, with a cable, or a wireless communication interface connected to a base station with a radio link.

In this connection, the compiler apparatus 100 may be configured without the media reader 106. If the compiler apparatus 100 is controllable using a terminal device operated by a user, the compiler apparatus 100 may be configured without the video signal processing unit 104 or the input signal processing unit 105. Furthermore, the display 111 and input device 112 may integrally formed with the casing of the compiler apparatus 100.

Figure 3:
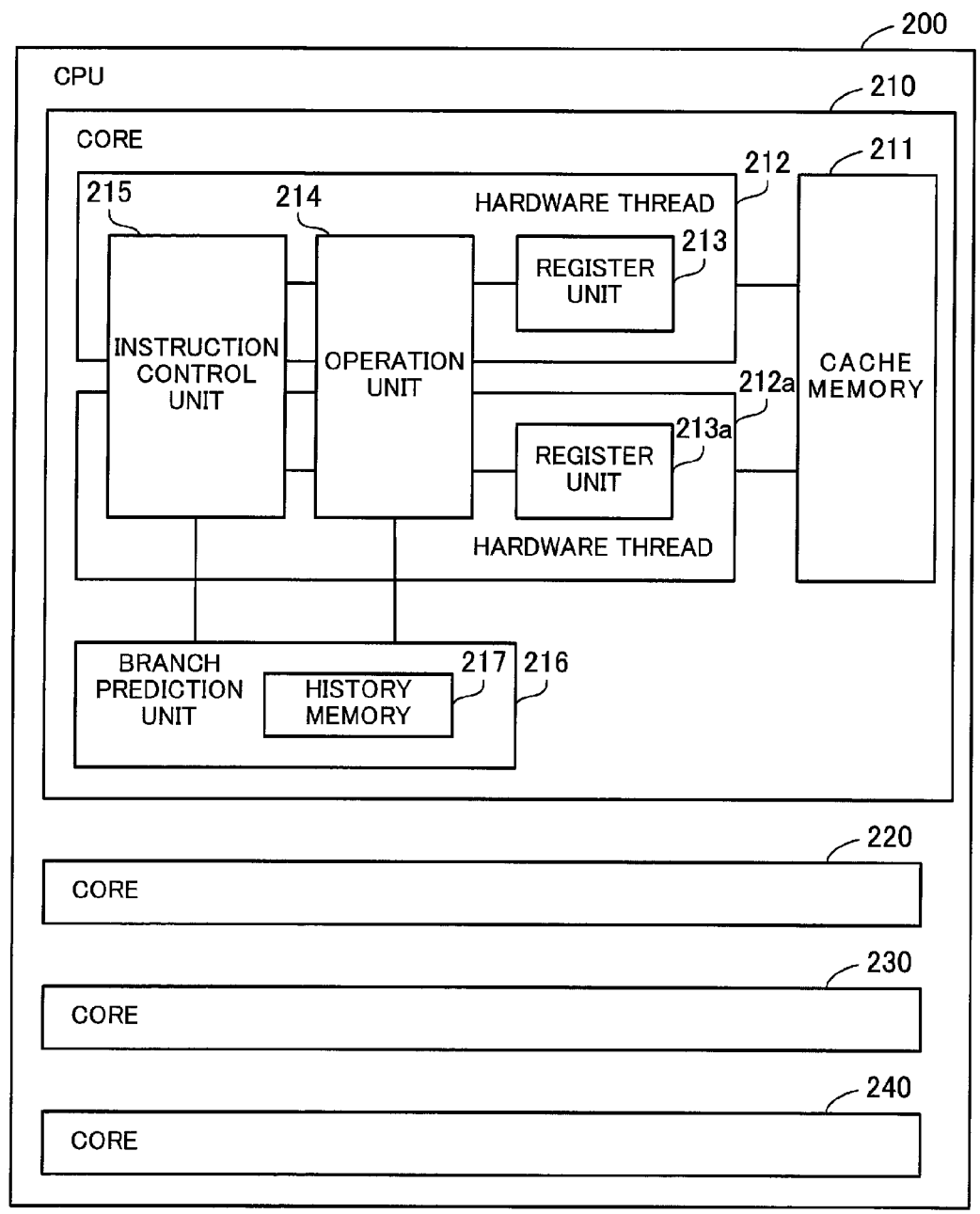
FIG. 3 is a block diagram illustrating an example of a configuration of a processor.

FIG. 3 is a block diagram illustrating an example of a configuration of a processor.

Object code generated by the compiler apparatus 100 may be executed by the above CPU 101 or another CPU. The other CPU may be provided in the compiler apparatus 100 or in another computer. In the second embodiment, it is assumed that a CPU 200 is the one that executes the object code.

The CPU 200 includes cores 210, 220, 230, and 240. The core 210 includes a cache memory 211, hardware threads 212 and 212a, and a branch prediction unit 216. The cores 220, 230, and 240 have the same units as the core 210. The number of cores and the number of hardware threads included in each core are just an example.

The cache memory 211 is a high-speed semiconductor memory that temporarily stores instructions and data stored in a secondary cache memory or a main memory that is provided outside the core 210. The cache memory 211 may be called a primary cache memory. The cache memory 211 is shared by the hardware threads 212 and 212a. That is to say, instructions and data from both the hardware threads 212 and 212a may be stored in the cache memory 211.

The hardware threads 212 and 212a are threads that are realized by hardware multithreading, and are units of execution that are executable in parallel. From the OS standpoint, the core 210 logically appears as a plurality of cores. Each hardware thread 212 and 212a is given a thread ID. For example, the hardware threads 212 and 212a have a thread #0 and a thread #1, respectively. The hardware threads 212 and 212a include register units 213 and 213a, respectively, and share an operation unit 214 and an instruction control unit 215.

The register units 213 and 213a are a set of registers that temporarily store data to be used by the operation unit 214. Data is transferred between the register 213 and 213a and the cache memory 211. The register unit 213 stores data of the hardware thread 212, while the register unit 213a stores data of the hardware thread 212a. However, registers may be dynamically selected from among a set of registers and may respectively be allocated to the hardware threads 212 and 212a.

The operation unit 214 includes one or more pipelines. To a pipeline, instructions from the hardware thread 212 or instructions from the hardware thread 212a, stored in the cache memory 211, are issued by the instruction control unit 215. The operation unit 214 uses the register unit 213 for executing the instructions from the hardware thread 212, and uses the register unit 213a for executing the instructions from the hardware thread 212a. The operation unit 214 is able to execute instructions from the hardware threads 212 and 212a in parallel on the pipeline.

In addition, the operation unit 214 may be provided with plural kinds of arithmetic devices that operate independently, such as an integer arithmetic unit and a floating point arithmetic unit. In this case, the operation unit 214 is able to perform different kinds of operations in parallel, which are executed by the hardware threads 212 and 212a. In this connection, the resources of the operation unit 214 are not statically, but dynamically allocated to the hardware threads 212 and 212a. It may be said that the hardware threads 212 and 212a share a set of resources. This reduces the number of idle resources, which exist when only one hardware thread runs.

The instruction control unit 215 performs scheduling for issuing instructions from the hardware threads 212 and 212a, which are to be executed by the operation unit 214, such as to reduce the number of idle resources (for example, such that instructions are placed as many as possible in a pipeline). For example, the instruction control unit 215 successively issues the instructions from the hardware thread 212, and when it goes into a wait state in which no more instructions are possible to be issued, then issues instructions from the hardware thread 212a. It is possible that instructions from the hardware thread 212 and instructions from the hardware thread 212a coexist in a pipeline. The instruction control unit 215 manages the thread ID for each instruction so as to determine which hardware thread 212 and 212a an issued instruction belongs to.

When a branch instruction indicating a conditional branch is fetched from the cache memory 211, the branch prediction unit 216 predicts the branch direction of this branch instruction on the basis of the previous branch directions of the branch instruction. When the branch instruction is executed, the execution will continue to the next sequential instruction (without jumping) (not-taken) or it will jump to an instruction away from the branch instruction (taken). The branch prediction unit 216 is shared by the hardware threads 212 and 212a. On the basis of the branch direction predicted by the branch prediction unit 216, the instruction control unit 215 determines which instruction to issue to the operation unit 214 next to the branch instruction, without waiting for an execution result of the branch instruction (speculative execution).

For example, the branch prediction unit 216 determines the burstiness (continuity) of branch taken or not-taken from the previous branch directions. If it is determined that the burstiness exists, the branch prediction unit 216 performs prediction in the following manner: in the case where a branch was taken several times in a row, it is predictable that the next branch direction is likely to be "taken"; and in the case where a branch was not taken several times in a row, it is predictable that the next branch direction is likely to be "not taken". In addition, for example, the branch prediction unit 216 determines a pattern of "taken" and "not-taken" from the previous branch directions. In the case where "taken" and "not-taken" appear alternately, it is predictable that the next branch direction is likely to be different from the last one.

To accumulate the history information regarding branch instructions, the branch prediction unit 216 has a history memory 217. The history memory 217 is a volatile semiconductor memory that stores a history table, which will be described later. The branch prediction unit 216 obtains the instruction address of an executed branch instruction and its execution result from the operation unit 214. Then, the branch prediction unit 216 calculates a hash value of the instruction address to calculate an index of the history table, and writes the information indicating the execution result (for example, a value of "1" indicating "taken" or a value of "0" indicating "not-taken") to the entry indicated by the index. One entry lists information indicating several most recent execution results to several tens of most recent execution results.

By the way, the core 210 is able to run the same program in parallel using the hardware threads 212 and 212a. The following describes problems in branch prediction in the case where the same program is executed in parallel and exemplary solutions to address them in the second embodiment.

Figure 4:
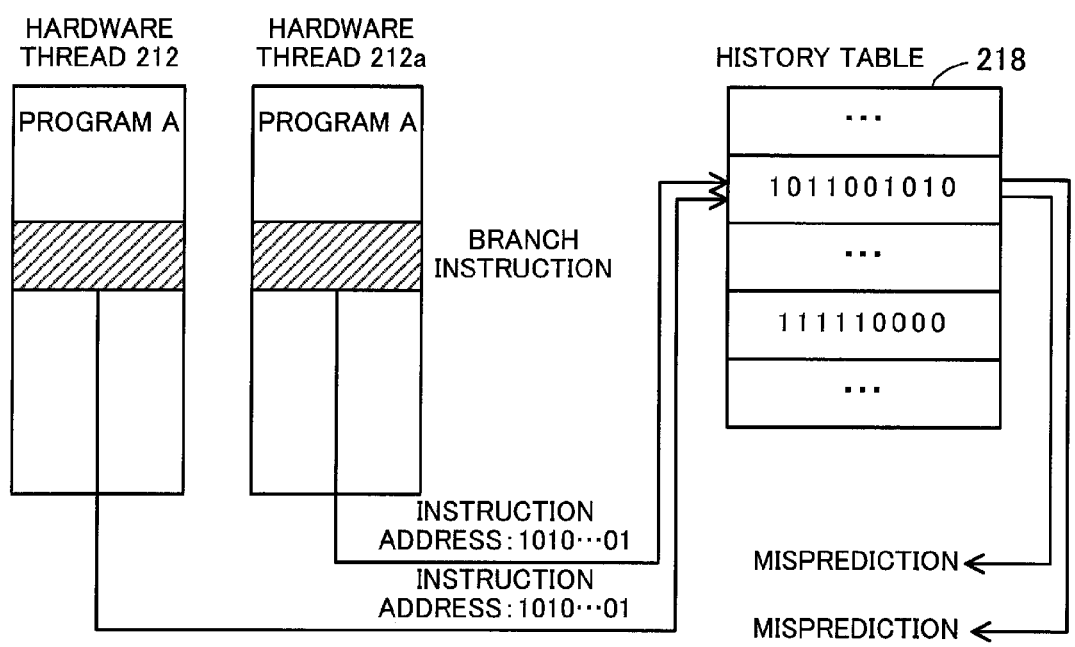
FIG. 4 illustrates an example of a conflict in an entry of a history table.

FIG. 4 illustrates an example of a conflict in an entry of a history table.

It is assumed that the same program A runs on the hardware threads 212 and 212a. It is also assumed that a history table 218 that associates an entry with an instruction address is stored in the history memory 217 of the branch prediction unit 216.

When a branch instruction included in the program A is executed by the hardware thread 212, the branch prediction unit 216 converts the instruction address of the branch instruction into an index of the history table 218 using the hash function, and writes information about the branch direction to the entry indicated by the index. In addition, the same branch instruction as the hardware thread 212 is executed by the hardware thread 212a. Since the same branch instruction has the same instruction address, the branch prediction unit 216 writes the information about the branch direction obtained by the hardware thread 212a to the same entry as used for the hardware thread 212.

Therefore, there are some entries in the history table 218 in which the execution results of a branch instruction obtained by the hardware threads 212 and 212a coexist. For example, in the case where branch directions were "taken" (a bit of "1") successively in a row in the hardware thread 212 and branch directions were "not-taken" (a bit of "0") successively in a row in the hardware thread 212a, these "taken" and "not-taken" results coexist in the entry.

Then, when the hardware thread 212 fetches the above branch instruction again, the branch prediction unit 216 converts the instruction address of the branch instruction into an index of the history table 218, and refers to the above entry indicated by the index. At this time, the branch prediction unit 216 predicts a branch direction for the hardware thread 212 on the basis of the history information indicating the most recent execution results obtained by both the hardware threads 212 and 212a. Similarly, when the hardware thread 212a fetches the above branch instruction again, the branch prediction unit 216 predicts a branch direction for the hardware thread 212a on the basis of the history information indicating the most recent execution results obtained by both the hardware threads 212 and 212a.

This causes a problem of degrading the prediction accuracy of the branch prediction unit 216 and increasing the probability of branch prediction failure (misprediction). Taking the long-term average, this problem is remarkably noticeable in branch instructions with the probability of each selection for branch direction being closer to 50%. Even if there is no long-term selection bias for a branch direction, there may be a local selection bias or pattern. In principle, the branch prediction unit 216 is able to increase the prediction accuracy, taking into account such a bias and pattern. However, taking an average using the execution results of both the hardware threads 212 and 212a causes difficulty with branch prediction using the local bias and pattern, thereby degrading the prediction accuracy.

On the other hand, it is not simple to modify the branch prediction unit 216 in terms of hardware. Therefore, in the second embodiment, an optimization function for increasing the branch prediction accuracy is added to an optimization process that the compiler apparatus 100 performs at the time of generating object code.

Figure 5:
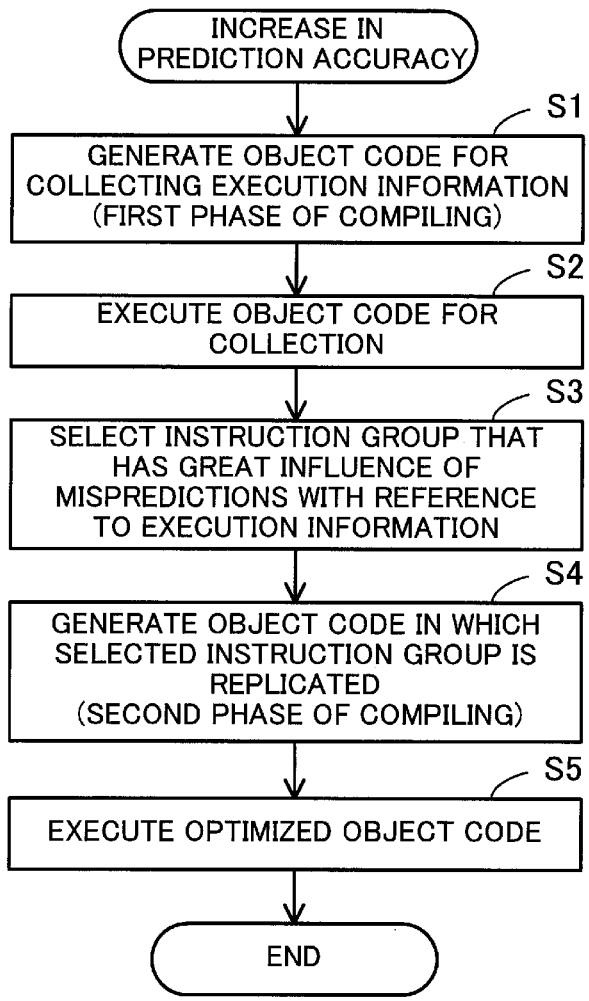
FIG. 5 is a flowchart illustrating an exemplary procedure for increasing prediction accuracy.

FIG. 5 is a flowchart illustrating an exemplary procedure for increasing prediction accuracy.

(S1) The compiler apparatus 100 translates source code into object code (first phase of compiling). At this time, the compiler apparatus 100 inserts, in the object code, an instruction so that execution information indicating an execution status is collected when the object code is executed by the CPU 200. The execution information to be collected includes information about the execution count of each instruction, the execution time of each instruction, the misprediction count for each branch instruction, and others.

(S2) The CPU 200 executes the object code for collection, generated at step S1, in response to a user-input command. At this time, in accordance with the instructions included in the object code, the CPU 200 monitors the execution count of each instruction, the execution time of each instruction, the misprediction count for each branch instruction, and others, and successively writes execution information to a specified file.

(S3) The compiler apparatus 100 starts to compile the source code into object code (second phase of compiling). At this time, the compiler apparatus 100 optimizes branch prediction on the basis of the execution information collected at step S2, in response to a user-input command. The compiler apparatus 100 selects an instruction group that includes a branch instruction and has a great influence of mispredictions, with reference to the execution information. An instruction group that has a great influence of mispredictions is a group of instructions that have a high probability of misprediction and a relatively long execution time (high execution cost).

(S4) The compiler apparatus 100 copies the instruction group selected at step S3, and adds an instruction to cause different hardware threads 212 and 212a to select different instruction groups (replication). Then, as a result of the second phase of compiling, the compiler apparatus 100 generates object code in which the instruction group including the branch instruction is replicated.

(S5) The CPU 200 executes the optimized object code generated at step S4, in response to a user-input command. With respect to a replicated portion, the hardware threads 212 and 212a execute instruction groups at different instruction addresses. That is to say, the branch instructions at different instruction addresses are executed.

Figure 6:
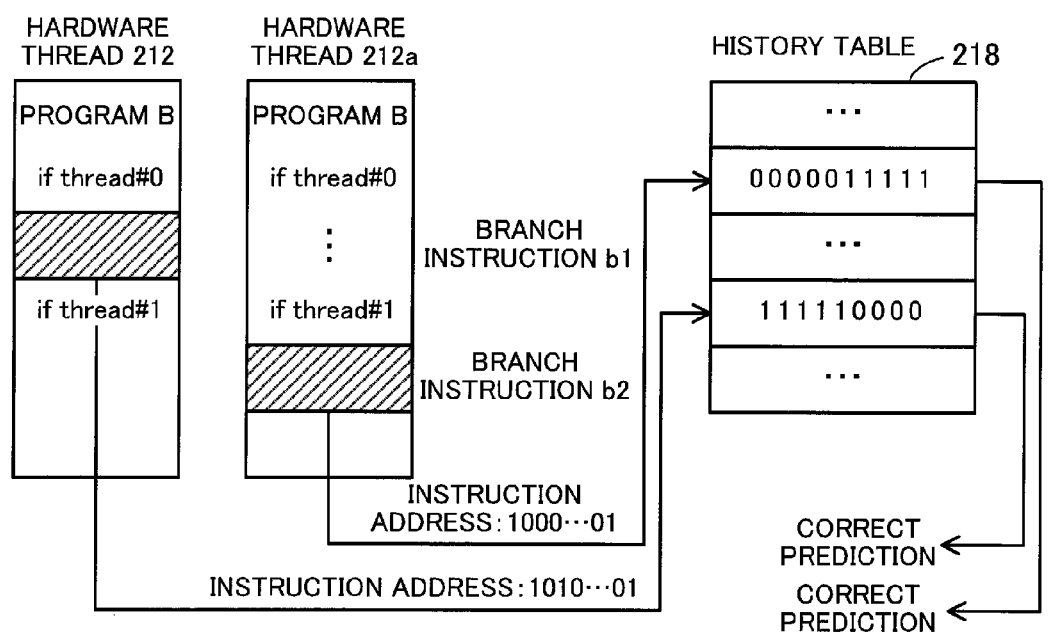
FIG. 6 illustrates an example of resolving a conflict in an entry of the history table.

FIG. 6 illustrates an example of resolving a conflict in an entry of the history table.

A program B optimized as described above includes branch instructions b1 and b2. The branch instruction b1 is executed only by a hardware thread whose thread ID is thread #0, and the branch instruction b2 is executed only by a hardware thread whose thread ID is thread #1. These two branch instructions are produced by copying a single branch instruction that exists prior to the optimization, and therefore have the same processing contents.

When the program B starts executing on both the hardware threads 212 and 212a, the branch instruction b1 for the thread #0 is executed by the hardware thread 212. Then, the branch prediction unit 216 converts the instruction address of the branch instruction b1 into an index of the history table 218, and writes information about the branch direction to the entry indicated by the index. On the other hand, the branch instruction b2 for the thread #1 is executed by the hardware thread 212a. Then, the branch prediction unit 216 converts the instruction address of the branch instruction b2 into an index of the history table 218, and writes information about the branch direction to the entry indicated by the index.

Since the branch instructions b1 and b2 are at different instruction addresses, information about the branch directions obtained by the hardware threads 212 and 212a are likely written to different entries in the history table 218. Therefore, with regard to a branch instruction that has a great influence of mispredictions, the probability of the execution results obtained by the hardware threads 212 and 212a coexisting in the same entry is reduced. This results in increasing the prediction accuracy of the branch prediction unit 216.

The following describes the functions of the compiler apparatus 100.

Figure 7:
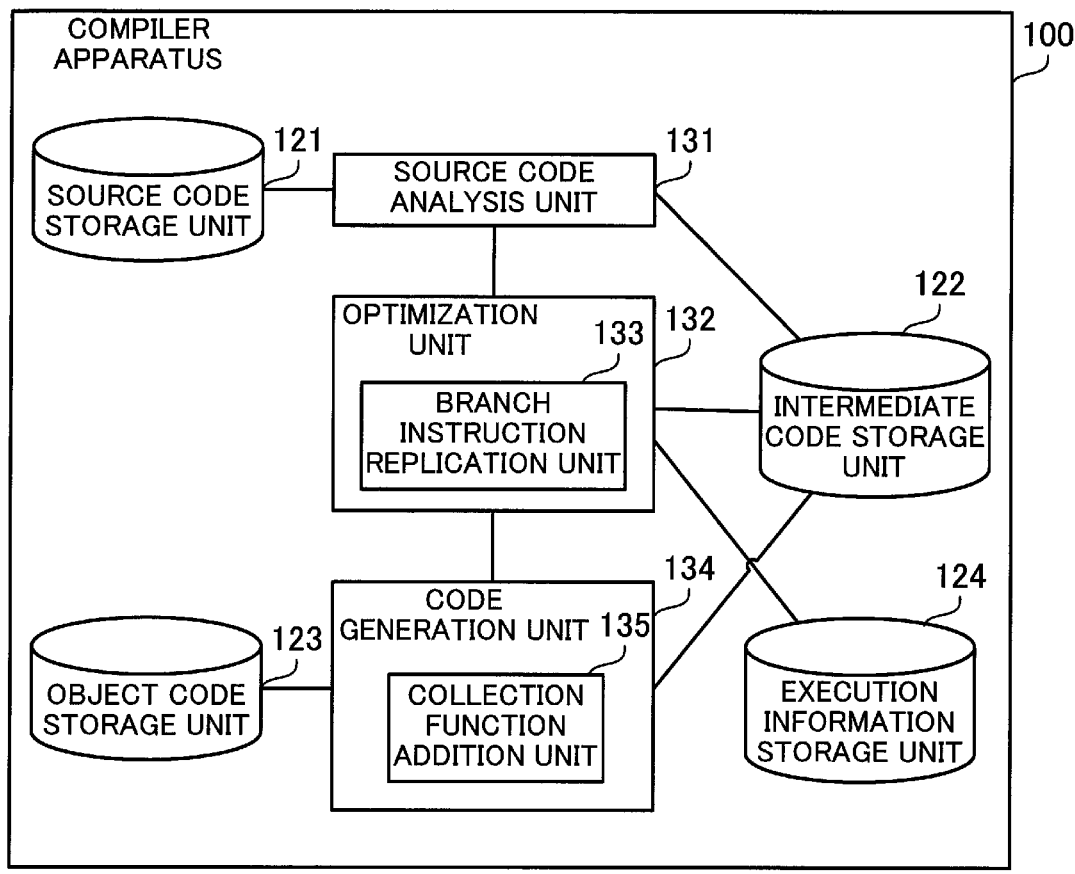
FIG. 7 is a block diagram illustrating an example of functions of a compiler apparatus.

FIG. 7 is a block diagram illustrating an example of functions of a compiler apparatus.

The compiler apparatus 100 includes a source code storage unit 121, an intermediate code storage unit 122, an object code storage unit 123, and an execution information storage unit 124. These units are implemented as storage space prepared in, for example, the RAM 102 or the HDD 103. The compiler apparatus 100 also includes a source code analysis unit 131, an optimization unit 132, and a code generation unit 134. These units are implemented as modules of a compiler program to be executed by the CPU 101.

The source code storage unit 121 stores source code written in high level language by a user. One example of the high level language is C language, which will be exemplified later. The source code may be generated using the compiler apparatus 100 or another apparatus.

The intermediate code storage unit 122 stores intermediate code obtained by translating the source code. The intermediate code is locally used during the course of compiling, and the compiler apparatus 100 may determine a format for the intermediate code. The optimization of the optimization unit 132 is performed on the intermediate code. Object code is generated from the intermediate code.

The object code storage unit 123 stores object code written in machine language. In the machine language, instructions and operands are represented by a bit sequence (numerical values). Since different instruction sets are supported depending on CPU architecture, the generated object code depends on a CPU that it is targeting. In the second embodiment, the object code is generated for the CPU 200, which is illustrated in FIG. 3, to execute.

The execution information storage unit 124 stores execution information indicating the execution status of object code. The execution information is generated by the CPU 200 when the CPU 200 is caused to execute the object code added with a collection function. The execution information may include software information indicating software-level execution status, such as the number of times a function was called, and hardware information indicating hardware-level execution status, such as the misprediction count of mispredictions made by the branch prediction unit 216.

The source code analysis unit 131 receives a compile command including the name of a source file in which source code is written. Then, the source code analysis unit 131 reads the specified source file from the source code storage unit 121, and performs front-end processing including lexical analysis, syntactic analysis, semantic analysis, and so on. Then, the source code analysis unit 131 generates intermediate code corresponding to the source code and stores the intermediate code in the intermediate code storage unit 122.

In addition, the source code analysis unit 131 analyzes the compile options included in the compile command and stores option information indicating the details of the compile options in the intermediate code storage unit 122. The compile options include an option to instruct generation of object code having a function of collecting execution information and an option to instruct optimization using collected execution information. In this connection, collection and use of execution information may be instructed for software information and hardware information separately.

The optimization unit 132 realizes various kinds of optimizations by rewriting the intermediate code stored in the intermediate code storage unit 122 so as to generate object code that is effective and takes a short execution time. The optimization processing includes reducing the number of instructions, changing the order of instructions, parallelizing instructions having dependency relationship, localizing memory accesses, and others. Some of these optimizations may involve referring to software information included in execution information. In addition, the optimization processing includes branch prediction optimization. The optimization unit 132 includes a branch instruction replication unit 133.

When a compile option to use hardware information included in execution information is specified, the branch instruction replication unit 133 optimizes branch prediction using the hardware information. The branch instruction replication unit 133 reads the hardware information from the execution information storage unit 124, and calculates a degree of influence of mispredictions with respect to an instruction portion including a branch instruction, on the basis of the hardware information. An instruction portion that includes a branch instruction with a higher probability of misprediction is recognized as having a greater degree of influence, and an instruction portion that takes a longer execution time (more number of cycles) is recognized as having a greater degree of influence. Then, the branch instruction replication unit 133 replicates an instruction group in the instruction portion with a high degree of influence. That is, the branch instruction replication unit 133 copies the instruction group including the branch instruction, and rewrites the intermediate code stored in the intermediate code storage unit 122 so that a different instruction group is executed depending on a thread ID.

The code generation unit 134 translates the optimized intermediate code stored in the intermediate code storage unit 122 into object code, and stores the object code in the object code storage unit 123. The translation from the intermediate code into the object code may be done via an assembly code. The code generation unit 134 has a collection function addition unit 135.

The collection function addition unit 135 inserts an instruction to collect software information in object code when a compile option to collect software information is specified. For example, the collection function addition unit 135 inserts, in the object code, an instruction to set up a flag for causing successive output of software information at the execution start time and unset the flag at the execution end time. In addition, the collection function addition unit 135 inserts an instruction to collect hardware information in the object code when a compile option to collect hardware information is specified. For example, the collection function addition unit 135 inserts, in the object code, an instruction to set up a flag for causing successive output of hardware information at the execution start time and unset the flag at the execution end time.

FIG. 8 illustrates an example of source code.

Source code 141 is stored in the source code storage unit 121. In the source code 141, a function sub_parent and a function sub_child are defined.

The function sub_parent includes a loop using a loop variable k (hereinafter, this loop may be referred to as a loop k). In the loop k, the function sub_child is repeatedly called. The function sub_child includes a loop using a loop variable i (hereinafter, this loop may be referred to as a loop i). The loop i includes a loop using a loop variable j (hereinafter, this loop may be referred to as a loop j). That is to say, the loop i is the outer loop of a double loop and the loop j is the inner loop of the double loop.

The loop j includes an if-else statement. In this if-else statement, an "operation 1" is performed when a variable ch is a value of A, an "operation 2" is performed when the variable ch is a value of B, not A, and an "operation 3" is performed when the variable ch is neither A nor B. This if-else statement is repeated in the double loop (loop i and loop j). In this connection, the operation of the if-else statement may be represented using a switch-case sentence.

FIG. 9 illustrates another example of source code.

Source code 142 describes the same operation as the source code 141, but uses a switch-case sentence in a double loop, in place of the if-else sentence. In this switch-case sentence, the value of a variable ch is checked, and the "operation 1" is performed when the value is A, the "operation 2" is performed when the value is B, not A, and the "operation 3" is otherwise performed as a default operation. The switch-case sentence is internally replaced with an if-else sentence, like in the source code 141, when the source code is translated into intermediate code. Therefore, intermediate codes indicating the same conditional branch are generated from an if-else sentence and from a switch-case sentence.

Figure 10:
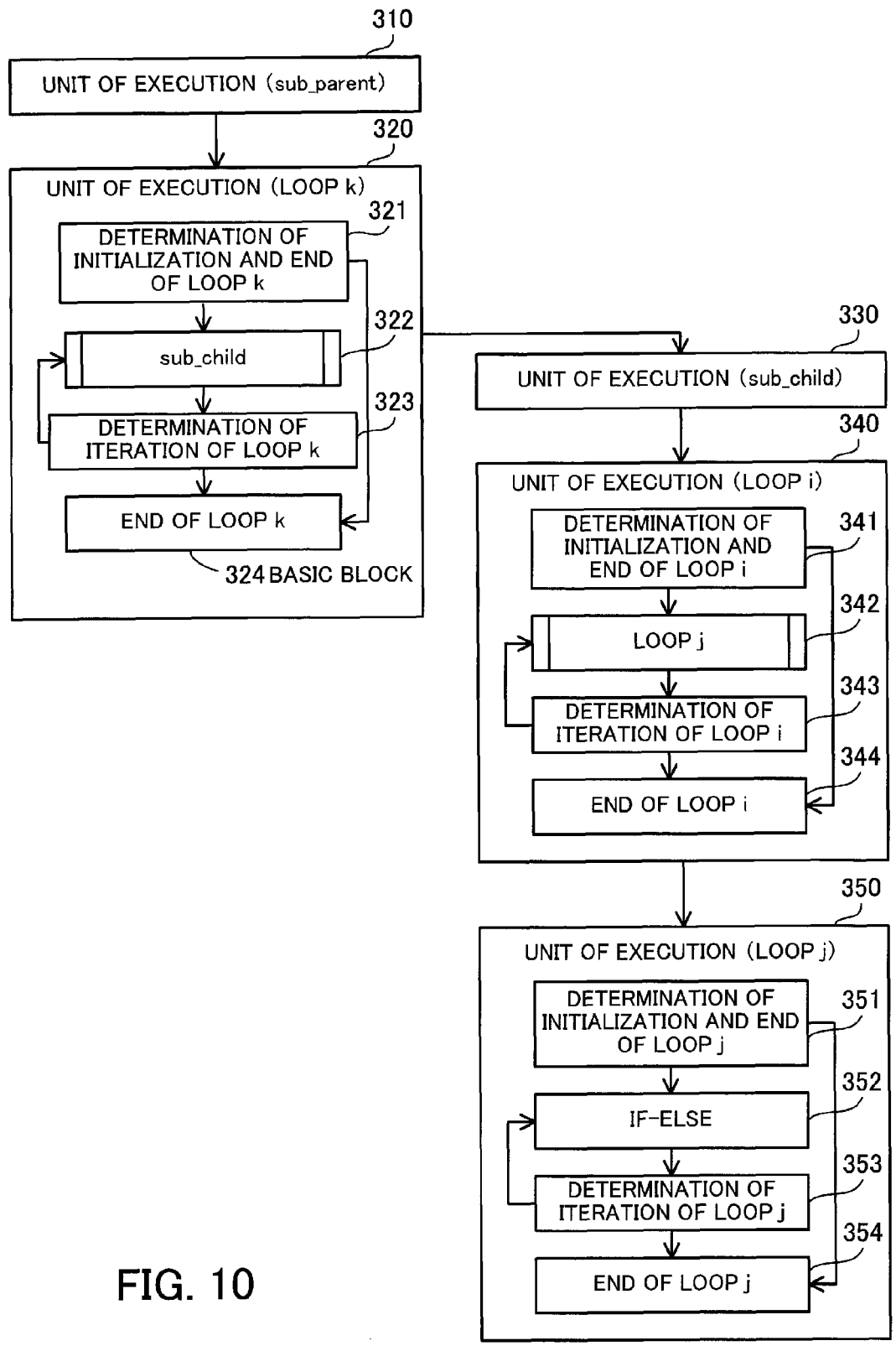
FIG. 10 illustrates an example of a structure of source code.

FIG. 10 illustrates an example of a structure of source code.

The source code 141 is recognized as a program having a structure illustrated in FIG. 10 through syntax analysis performed by the source code analysis unit 131. A program includes one or more units of execution. A single unit of execution is a group of instructions that are defined as a single function, a single loop, or the like, in source code. The unit of execution includes one or more basic blocks. A single basic block is a shortest instruction sequence in which there is only one instruction at the start point and there are no instructions that branch to other basic blocks, other than an instruction at the end point.

Units of execution 310, 320, 330, 340, and 350 are extracted from the source code 141. The unit of execution 310 corresponds to the function sub_parent, and the unit of execution 320 corresponds to the loop k. The unit of execution 330 corresponds to the function sub_child, and the unit of execution 340 corresponds to the loop i. The unit of execution 350 corresponds to the loop j. The unit of execution 310 is a parent unit that includes the unit of execution 320. The unit of execution 340 is a parent unit that includes the unit of execution 350. The unit of execution 330 is a parent unit that includes the unit of execution 340.

The unit of execution 320 includes basic blocks 321, 322, 323, and 324. The basic block 321 is for determination of initialization and loop end with respect to the loop variable k. The basic block 321 branches to the basic blocks 322 and 324. The basic block 322 is for calling the unit of execution 330. The basic block 323 is for determination of loop iteration. The basic block 323 branches to the basic blocks 322 and 324. The basic block 324 is for a loop end process.

The unit of execution 340 includes basic blocks 341, 342, 343, and 344. These basic blocks 341, 342, 343, and 344 have the same loop structure as the unit of execution 320, except that the basic block 342 is for calling the unit of execution 350. The unit of execution 350 includes basic blocks 351, 352, 353, and 354. These basic blocks 351, 352, 353, and 354 have the same loop structure as the units of execution 320 and 340, except that the basic block 352 is for a conditional branch using an if-else sentence.

A basic block indicating a conditional branch using an if-sentence may be called an IF block. A basic block indicating a conditional branch using an if-else sentence may be called an IF-ELSE block. Hereinafter, these blocks may collectively be called an IF block group.

The following describes a back-dominator, which is a basic block. For each basic block, there is another basic block that satisfies prescribed conditions on the graph of a basic block group, and that is called a back-dominator. More specifically, among basic blocks that appear on all paths to a certain basic block, a back-dominator is a basic block that has the shortest path to the certain basic block.

For example, in the unit of execution 350, the back-dominator of the basic block 352 is the basic block 351, and the back-dominator of the basic block 353 is the basic block 352. As paths to the basic block 354, there are a path from the basic block 351 via the basic blocks 352 and 353 and a path from the basic block 351 with detouring around the basic blocks 352 and 353. Therefore, the back-dominator of the basic block 354 is the basic block 351.

FIG. 11 illustrates an example of compile commands.

A compile command 143 is an example of a compile command that is entered at the time of the first phase of compiling, that is, at the time of generating object code having a function of collecting execution information. A compile command 144 is an example of a compile command that is entered at the time of the second phase of compiling, that is, at the time of generating object code optimized using the execution information.

Each compile command 143 and 144 includes a source file name and an execute file name. The source file name indicates a path to a file in which source code is written. The execute file name indicates a path to a file for storing generated object code.

The compile command 143 includes an OPTprofile:collect option and an OPThw-counter:collect option. The former option is for collecting software information and specifies a file as an output destination of the software information. The latter option is for collecting hardware information and specifies a file as an output destination of the hardware information. In this connection, a file to be used as an output destination may not be specified, and if no file name is specified, then a file with a default name in a default directory (for example, the same directory as the execute file) is regarded as being specified.

The compile command 144 includes an OPTprofile:use option and an OPThw-counter:use option. The former option is for optimization using software information and specifies a file in which the software information is written. The latter option is for optimization using hardware information and specifies a file in which the hardware information is written. In this connection, a file that is an input source of software or hardware information may not be specified, and if no file name is specified, then a file with a default name in a default directory (for example, the same directory as the execute file) is regarded as being specified.

In addition, the compile command 144 includes a cost threshold and a misprediction threshold. The cost threshold and the misprediction threshold are used for determining whether to copy an instruction group including a branch instruction in branch prediction optimization, as will be described later. The cost threshold may be omitted, and if no cost threshold is included, then a default value (for example, 7) is used. Similarly, the misprediction threshold may also be omitted, and if no misprediction threshold is included, then a default value (for example, 8) is used.

FIG. 12 illustrates an example of collected execution information.

In the execution information storage unit 124, for example, software information 145 and 146 and hardware information 147 and 148 are stored. The software information 145 is information output from the hardware thread 212, while the software information 146 is information output from the hardware thread 212*a*. The hardware information 147 is information output from the hardware thread 212, while the hardware information 148 is information output from the hardware thread 212*a*.

The software information 145 indicates an execution count for each line of the source code 141 executed by the hardware thread 212. In addition, the software information 145 indicates an execution count for each unit of execution (function, loop, etc.) of the source code 141 executed by the hardware thread 212. Similarly, the software information 146 indicates an execution count for each line and an execution count for each unit of execution with respect to the source code 141 executed by the hardware thread 212*a*. In this connection, the object code having the collection function includes information indicating which line and which unit of execution in the source code 141 each instruction corresponds to.

The hardware information 147 indicates, for each instruction of object code executed by the hardware thread 212, an execution count and the number of cycles used for executing the instruction. The hardware information 147 also indicates, for each branch instruction executed by the hardware thread 212, the misprediction count of mispredictions made by the branch prediction unit 216. Similarly, the hardware information 148 indicates an execution count for each instruction and the number of cycles used for executing the instruction with respect to the object code executed by the hardware thread 212*a*. The hardware information 148 also indicates, for each branch instruction executed by the hardware thread 212*a*, the misprediction count of mispredictions made by the branch prediction unit 216. In this connection, instructions included in the object code are identified based on instruction addresses.

The following describes a compile procedure that is performed by the compiler apparatus 100.

Figure 13:
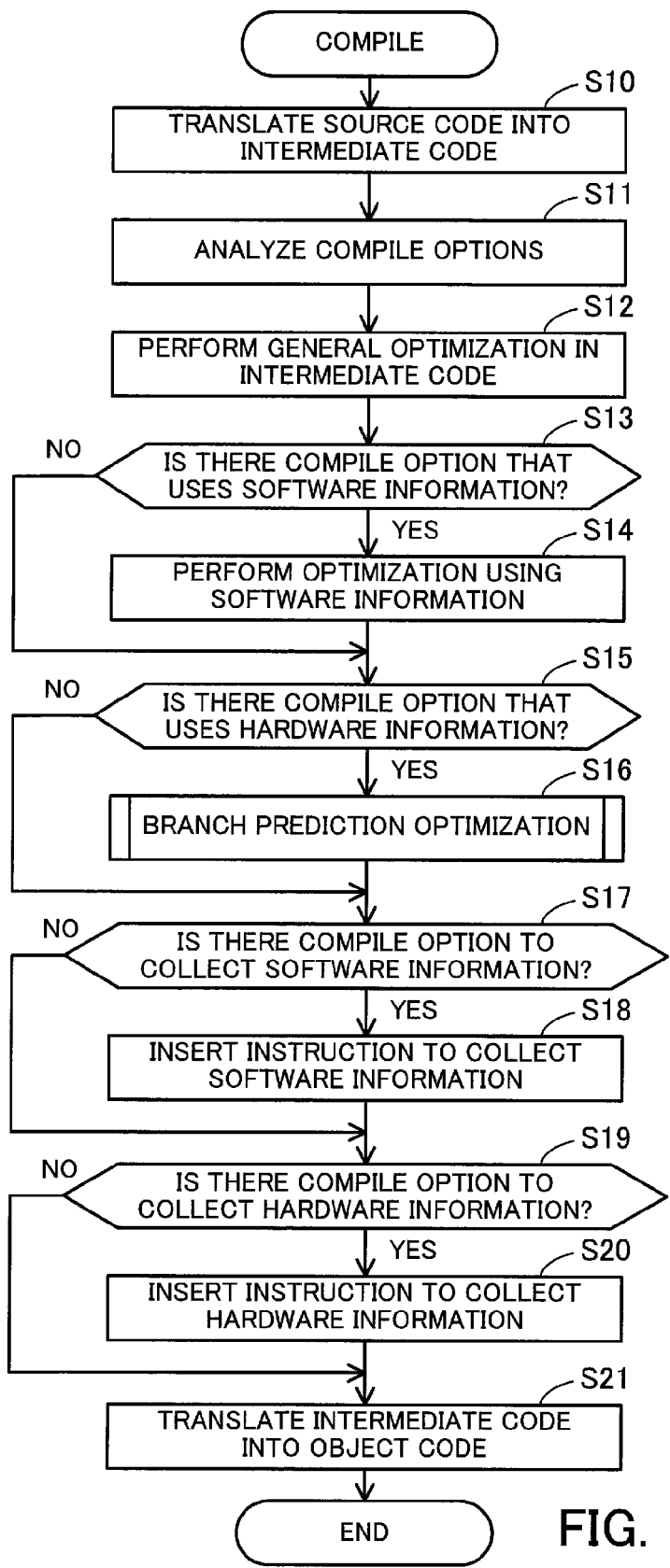
FIG. 13 is a flowchart illustrating an example of a compile procedure.

FIG. 13 is a flowchart illustrating an example of a compile procedure.

(S10) The source code analysis unit 131 reads source code from a source file specified by a compile command, and performs front-end processing including lexical analysis, syntactic analysis, semantic analysis, and so on. Then, the source code analysis unit 131 translates the source code into intermediate code and stores the intermediate code in the intermediate code storage unit 122.

(S11) The source code analysis unit 131 analyzes the compile options included in the compile command and stores the details of the compile options in the intermediate code storage unit 122. Compile options may relate to collection of software information, collection of hardware information, optimization using software information, optimization using hardware information, and others.

(S12) The optimization unit 132 performs general optimization that does not depend on CPU architecture, in the intermediate code stored in the intermediate code storage unit 122. The general optimization may include, for example, deleting unneeded operations that do not affect a final result, deleting unneeded variables, changing the order of instructions that do not have dependency relationship, parallelizing the instructions, and others.

(S13) The optimization unit 132 determines with reference to the intermediate code storage unit 122 whether a compile option for optimization using software information is specified or not. If this compile option is specified, the process proceeds to step S14. Otherwise, the process proceeds to step S15.

(S14) The optimization unit 132 reads software information specified by the compile option from the execution information storage unit 124, and optimizes the intermediate code stored in the intermediate code storage unit 122, using the software information. The optimization using software information may include, for example, changing the branch directions of an if-else sentence so that an instruction sequence which is frequently executed does not jump, changing the order of variables so as to localize memory space with high access frequency, and others. In this connection, to calculate an execution frequency of a line or a unit of execution, the execution frequencies corresponding to the hardware threads 212 and 212*a* are individually calculated, and then a higher execution frequency may be taken as the execution frequency. Alternatively, the average of the execution counts by the hardware threads 212 and 212*a* is calculated, and then the execution frequency may be calculated based on the average execution count.

(S15) The optimization unit 132 determines with reference to the intermediate code storage unit 122 whether a compile option for optimization using hardware information is specified or not. If this compile option is specified, the process proceeds to step S16. Otherwise, the process proceeds to step S17.

(S16) The optimization unit 132 reads hardware information specified by the compile option from the execution information storage unit 124 and optimizes branch prediction in the intermediate code stored in the intermediate code storage unit 122, using the hardware information, as will be described later.

(S17) The code generation unit 134 determines with reference to the intermediate code storage unit 122 whether a compile option to collect software information is specified or not. If this compile option is specified, the process proceeds to step S18. Otherwise, the process proceeds to step S19.

(S18) The code generation unit 134 inserts an instruction to successively output software information during the course of executing the object code, at the head of the object code. At this time, the code generation unit 134 embeds the file name of an output destination for the software information in the object code. The code generation unit 134 also inserts an instruction to stop the output of the software information at the end of the object code.

(S19) The code generation unit 134 determines with reference to the intermediate code storage unit 122 whether a compile option to collect hardware information is specified or not. If this compile option is specified, the process proceeds to step S20. Otherwise, the process proceeds to step S21.

(S20) The code generation unit 134 inserts an instruction to successively output hardware information during the course of executing the object code, at the head of the object code. At this time, the code generation unit 134 embeds the file name of an output destination for the hardware information in the object code. The code generation unit 134 also inserts an instruction to stop the output of the hardware information at the end of the object code.

(S21) The code generation unit 134 translates the intermediate code stored in the intermediate code storage unit 122 into object code, and writes the object code to an execute file specified by the compile command. This object code may include instructions for collecting software information and hardware information, as explained at steps S18 and S20.

Figure 14:
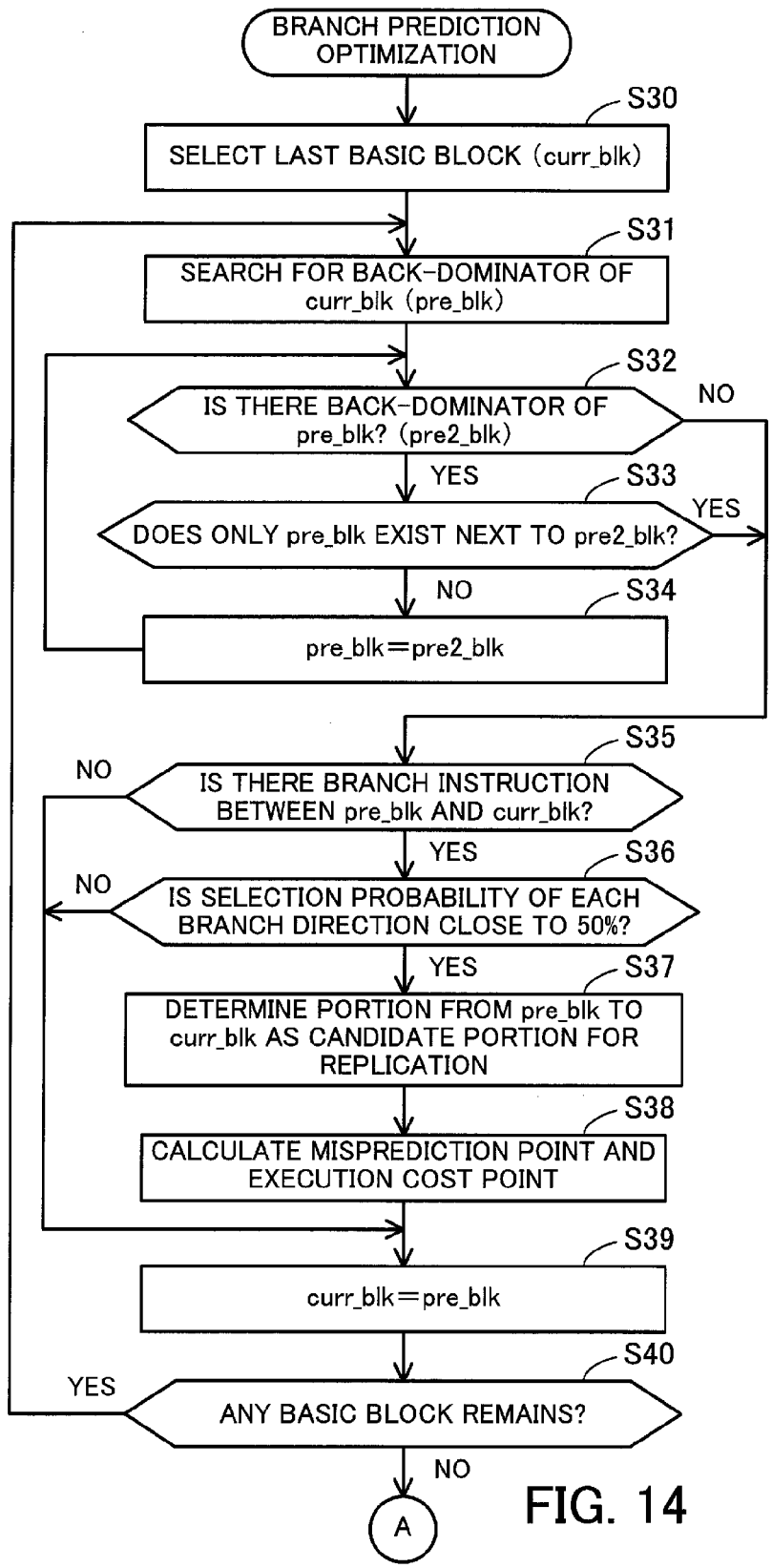
FIGS. 14 to 16 are a flowchart illustrating a procedure for branch prediction optimization.
Figure 15:
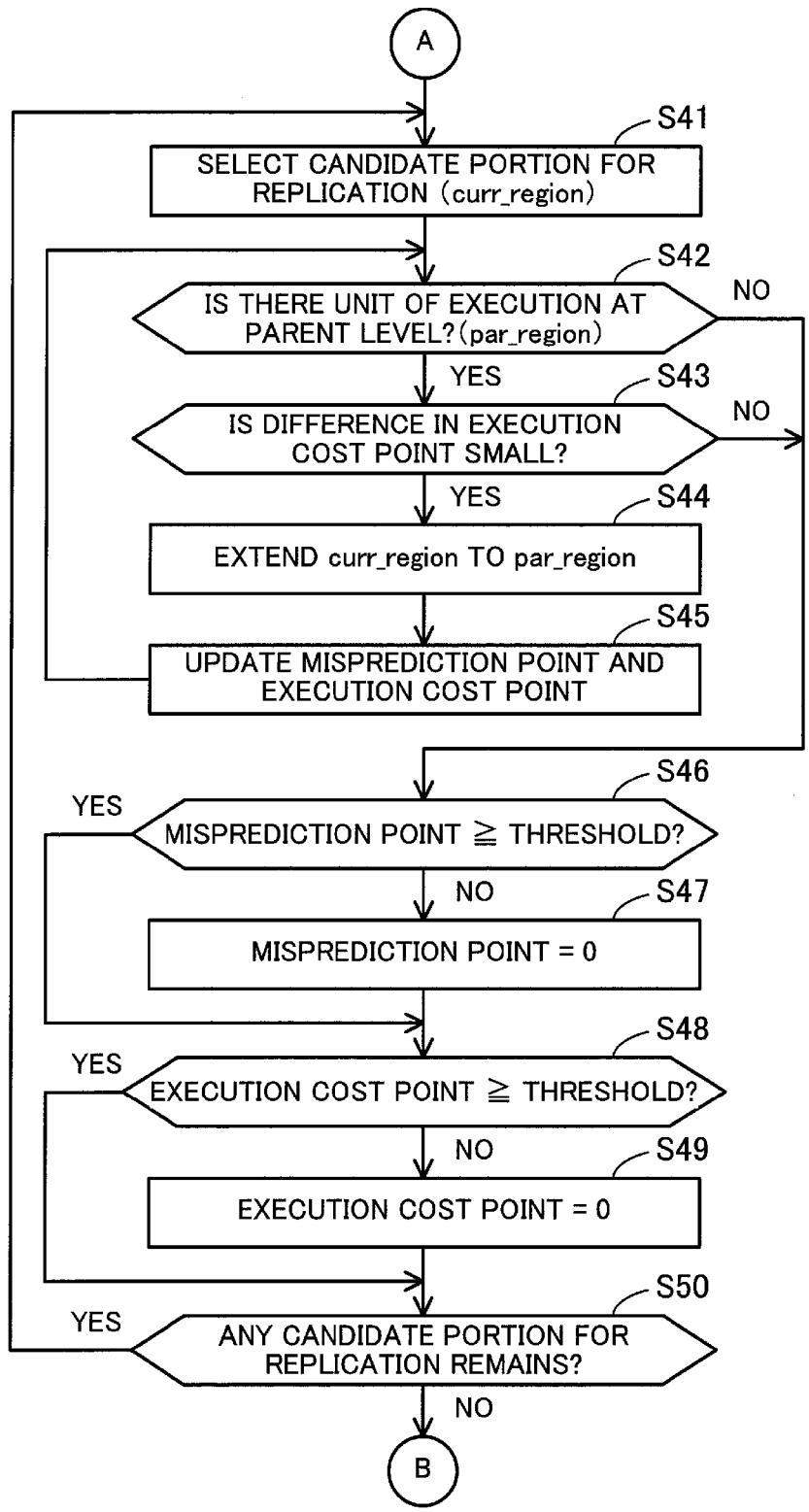
Figure 16:
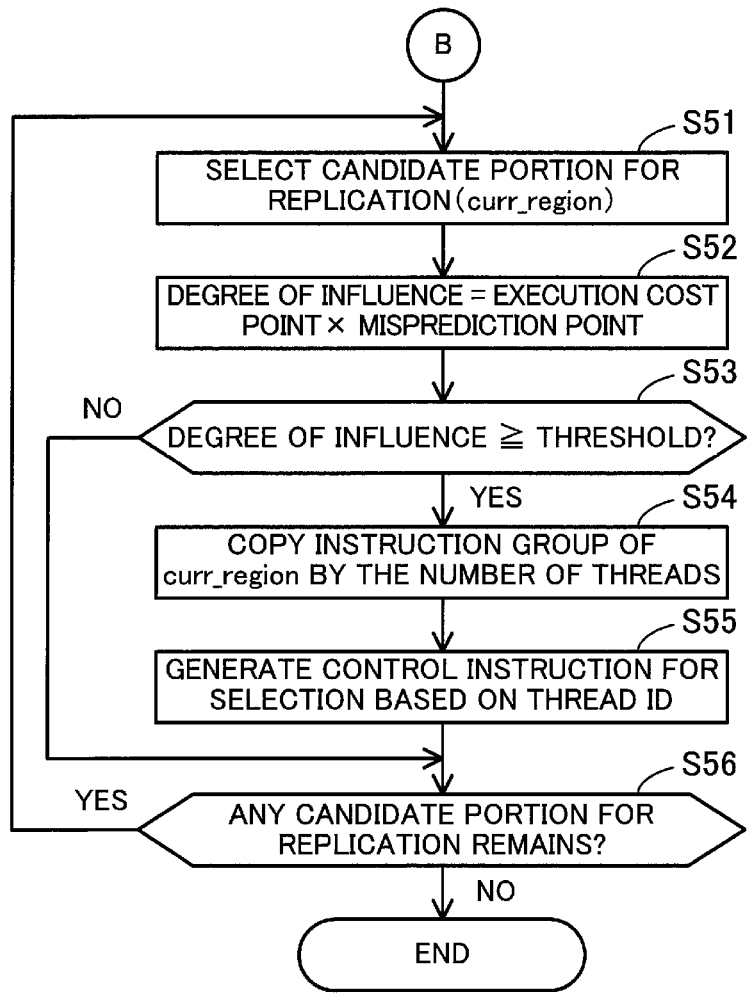

FIGS. 14 to 16 are a flowchart illustrating a procedure for branch prediction optimization. This branch prediction optimization is performed at above-described step S16.

(S30) The optimization unit 132 selects a basic block that is executed last among all the units of execution. The selected basic block is taken as curr_blk.

(S31) The optimization unit 132 searches for the back-dominator of curr_blk. More specifically, the optimization unit 132 detects a basic block that has the shortest path from curr_blk, among basic blocks that appear on all paths to curr_blk, on the graph of the basic block group. The found basic block is taken as pre_blk.

(S32) The optimization unit 132 further searches for a basic block that is the back-dominator of pre_blk. If such a basic block is found, this basic block is taken as pre2_blk, and the process proceeds to step S33. If there is no such a basic block, then the process proceeds to step S35.

(S33) The optimization unit 132 confirms a path between pre2_blk and pre_blk, and determines whether there is only the basic block pre_blk that is executed next to pre2_blk. If the path between pre2_blk and pre_blk satisfies this condition, the process proceeds to step S35. Otherwise, the process proceeds to step S34.

(S34) The optimization unit 132 takes the current pre2_blk as pre_blk. Then, the process proceeds to step S32.

(S35) The optimization unit 132 determines whether there is a branch instruction included in an IF block group (IF block or IF-ELSE block) between pre_blk and curr_blk. This branch instruction is an instruction indicating a conditional branch. If such a branch instruction exists, the process proceeds to step S36. Otherwise, the process proceeds to step S39.

(S36) The optimization unit 132 calculates the selection probability of each of the branch directions (taken and not-taken) with respect to the branch instruction, on the basis of the hardware information. For example, the selection probability of each branch direction is calculated from the execution count of the branch instruction and the individual execution counts of its next instructions, indicated by the hardware information. In this connection, a higher one of the selection probabilities individually calculated for the hardware threads 212 and 212a may be taken as the selection probability. Alternatively, the average of the execution counts by the hardware threads 212 and 212a is calculated, and then the selection probability may be calculated based on the average execution count.

Then, the optimization unit 132 determines whether the selection probability of each branch direction is close to 50% or not. If a branch instruction has a selection probability close to 50%, it is estimated that a misprediction likely occurs. For example, the optimization unit 132 determines whether the selection probability falls within a range centered at 50% (for example, within a range of 40% to 60%) or not. If the calculated selection probability satisfies this condition, the process proceeds to step S37. Otherwise, the process proceeds to step S39.

(S37) The optimization unit 132 extracts an instruction group belonging to a portion from the current pre_blk to curr_blk, as a candidate portion for replication.

(S38) The optimization unit 132 calculates a misprediction point and an execution cost point for the candidate portion for replication, extracted at step S37, on the basis of the hardware information. The misprediction point is a value indicating the frequency of mispredictions for the branch instruction included in the portion. For example, this frequency is calculated using the following formula: the misprediction count÷the execution count of branch instruction× 100. The execution cost point is a value indicating the frequency of executions of the instructions included in the portion. For example, this frequency is calculated using the following formula: the total number of cycles for the instructions in the portion÷the total number of cycles for the entire object code×100.

In this connection, a greater one of the misprediction points and a greater one of the execution cost points calculated for the hardware threads 212 and 212a may be taken as the misprediction point and the execution cost point. Alternatively, the average of the execution counts and the average of the numbers of cycles by the hardware threads 212 and 212a are calculated, and then the misprediction point and the execution cost point may be calculated based on the average execution count and the average number of cycles.

(S39) The optimization unit 132 takes pre_blk as curr_blk.

(S40) The optimization unit 132 determines whether there is any basic block remaining in all the units of execution. If there is any remaining basic block, the process proceeds back to step S31. If no basic block remains, the process proceeds to step S41.

Now let us turn to FIG. 15.

(S41) The optimization unit 132 selects one of the candidate portions for replication. The selected candidate portion is taken as curr_region.

(S42) The optimization unit 132 determines whether there is a unit of execution at the parent level that includes curr_region. The unit of execution at the parent level may be, for example, an outer loop including a loop, a function including the loop, or the like. If there is such a unit of execution at the parent level, the process proceeds to step S43. In this case, the unit of execution at the upper level is taken as par_region. Otherwise, the process proceeds to step S46.

(S43) The optimization unit 132 calculates the execution cost point of par_region. For example, the execution cost point is calculated using the following formula: the total number of cycles for instructions included in par_region÷the total number of cycles for the entire object code×100. Since par_region includes the instructions included in curr_region, the execution cost point of par_region is greater than or equal to that of curr_region.

Then, the optimization unit 132 determines whether a difference in execution cost point between par_region and curr_region is small or not. For example, the optimization unit 132 determines whether the execution cost point of curr_region is 80% or greater of that of par_region or not. In other words, the optimization unit 132 determines whether most of the execution cost of par_region occurs due to curr_region or not. If this condition is satisfied, the process proceeds to step S44. Otherwise, the process proceeds to step S46.

(S44) The optimization unit 132 extends the candidate portion (curr_region) for replication, selected at step S41, to the unit of execution at the parent level (par_region).

(S45) The optimization unit 132 calculates the misprediction point of the extended curr_region, that is, par_region. For example, with respect to the branch instructions included in par_region, the optimization unit 132 calculates the following formula: the misprediction count÷the execution count of the branch instructions×100. The optimization unit 132 updates the misprediction point and execution cost point of the extended cur_region to those of par_region. Then, the process proceeds to step S42.

(S46) The optimization unit 132 determines whether the misprediction point of curr_region is greater than or equal to a threshold or not. To this end, the optimization unit 132 refers to the details of the compile options stored in the intermediate code storage unit 122, and uses a misprediction threshold specified by a user if there is. If no misprediction threshold is specified, then the optimization unit 132 uses a default value (for example, 8) as the threshold. If the misprediction point is greater than or equal to the threshold, the process proceeds to step S48. Otherwise, the process proceeds to step S47.

(S47) The optimization unit 132 updates the misprediction point of curr_region to zero. This means that branch instructions with low probability of misprediction is excluded from being subjected to optimization.

(S48) The optimization unit 132 determines whether the execution cost point of curr_region is greater than or equal to a threshold or not. To this end, the optimization unit 132 refers to the details of the compile options stored in the intermediate code storage unit 122, and uses a cost threshold specified by a user if there is. If no cost threshold is specified, then the optimization unit 132 uses a default value (for example, 7) as the threshold. If the execution cost point is greater than or equal to the threshold, the process proceeds to step S50. Otherwise, the process proceeds to step S49.

(S49) The optimization unit 132 updates the execution cost point of curr_region to zero. This means that branch instructions with low execution frequency is excluded from being subjected to optimization.

(S50) The optimization unit 132 determines whether there is any candidate portion for replication that is not selected at step S41. If there is such a candidate portion, the process proceeds back to step S41. If all the candidate portions were selected, then the process proceeds to step S51.

Now let us turn to FIG. 16

(S51) The optimization unit 132 selects one of the candidate portions for replication. This selected candidate portion is taken as curr_region.

(S52) The optimization unit 132 calculates the degree of influence of curr_region using the following formula: execution cost point of curr_region×misprediction point.

(S53) The optimization unit 132 determines whether the degree of influence calculated at step S52 is greater than or equal to a threshold or not. The influence threshold is calculated using the following formula: cost threshold×misprediction threshold. If the cost threshold and the misprediction threshold are specified by the user, the optimization unit 132 calculates the influence threshold from the specified thresholds. If neither threshold is specified, then the optimization unit 132 uses a default value as the influence threshold. For example, assuming that the default cost threshold is 8 and the default misprediction threshold is 7, the default influence threshold is calculated as 56. If the degree of influence is greater than or equal to the threshold, the process proceeds to step S54. Otherwise, the process proceeds to step S56.

(S54) The optimization unit 132 copies an instruction group (including a branch instruction) included in curr_region such that the number of sets of the instruction group matches the number of hardware threads provided in each core of the CPU 200. In the case where there are two hardware threads, for example, a single copy of the instruction group included in curr_region is made, thereby obtaining two sets of the instruction group.

(S55) The optimization unit 132 generates a control instruction having a control structure for selecting one of the plurality of instruction groups obtained at step S54 according to the thread ID of a hardware thread executing the object code. For example, the optimization unit 132 gives a label including a different thread ID to the head of each of the plurality of instruction groups, and inserts a control instruction to confirm the thread ID of the executing hardware thread and jump to a corresponding label, before each of the plurality of instruction groups. In the case where a copied unit of execution is a function, for example, the optimization unit 132 adds a different thread ID to each function name of the plurality of functions, and creates a control instruction to confirm the thread ID of the executing hardware thread and call a corresponding function.

(S56) The optimization unit 132 determines whether there is any candidate portion for replication that is not selected at step S51. If there is such a candidate portion, the process proceeds to step S51. If all the candidate portions were selected, then the branch prediction optimization is completed.

FIG. 17 illustrates a first example of optimized code.

Optimized code 151 is obtained by optimizing branch prediction in the source code 141 illustrated in FIG. 8. Although the branch prediction is optimized in intermediate code, the optimization result is illustrated in source code form in this example for easy understanding.

In the optimized code 151, a function sub_parent and a function sub_child are defined. The function sub_parent includes the loop k. The function sub_child includes the loop i. The loop i includes the loop j. These units of execution have the same structure as those of the source code 141. However, in the optimized code 151, an IF-ELSE block in the loop j is a portion selected for replication. The loop j has code blocks 151a, 151b, and 151c as a replication result.

The code block 151a is to confirm the thread ID of an executing hardware thread and to jump to a label including the thread ID (the head of the code block 151b or 151c). For example, when the optimized code 151 is executed by the hardware thread 212, the code block 151a jumps to the head of the code block 151b. When the optimized code 151 is executed by the hardware thread 212a, the code block 151a jumps to the head of the code block 151c.

The code block 151b includes the same if-else sentence as the source code 141. The code block 151b includes a branch instruction indicating a conditional branch. In addition, the code block 151c includes the same if-else sentence as the source code 141, that is, the same if-else sentence as the code block 151b. The code block 151c includes the branch instruction indicating the conditional branch. Therefore, when the optimized code 151 is executed by the hardware threads 212 and 212a, the branch instructions at different instruction addresses are selectively executed by the hardware threads, but actually the same operation is performed by the hardware threads.

FIG. 18 illustrates a second example of optimized code.

In optimized code 152, a function sub_parent and a function sub_child are defined. The function sub_parent includes the loop k. The function sub_child includes the loop i. These units of execution have the same structure as those of the source code 141. However, in the optimized code 152, the loop j is a portion selected for replication. The loop i includes a plurality of copies of the loop j. The loop i includes code blocks 152a, 152b, and 152c as a replication result.

The code block 152a is to confirm the thread ID of an executing hardware thread and jump to a label including the thread ID (the head of the code block 152b or 152c). For example, when the optimized code 152 is executed by the hardware thread 212, the code block 152a jumps to the head of the code block 152b. When the optimized code 152 is executed by the hardware thread 212a, the code block 152a jumps to the head of the code block 152c.

The code block 152b includes the same loop j as the source code 141. The code block 152b includes a branch instruction indicating a conditional branch. In addition, the code block 152c includes the same loop j as the source code 141, that is, the same loop j as the code block 152b. The code block 152c includes the branch instruction indicating the conditional branch. Therefore, when the optimization code 152 is executed by the hardware threads 212 and 212a, the branch instructions at different instruction addresses are selectively executed by these hardware threads, but the same operation is performed by the hardware threads.

Compared with the optimized code 151, in the optimized code 152, the code block 152a that is to determine where to jump to according to the thread ID of an executing hardware thread is outside the loop j. This reduces the number of times a jump destination is determined according to a thread ID. In the case where the execution cost of the if-else sentence occupies most of the execution cost of the loop j, such an extension of the portion to be replicated reduces overhead of the replication and improves the execution efficiency of the object code.

FIG. 19 illustrates a third example of optimized code.

In optimized code 153, the function sub_child of the source code 141 is a portion selected for replication. The optimized code 153 includes a function sub_child[0] (code block 153b) and a function sub_child[1] (code block 153c). In addition, in the optimized code 153, a function sub_parent is defined. The function sub_parent includes the loop k. The loop k includes a code block 153a.

The code block 153a is to confirm the thread ID of an executing hardware thread and to call the function with a function name including the thread ID (the code block 153b or 153c). For example, when the optimized code 153 is executed by the hardware thread 212, the function of the code block 153b is called. When the optimized code 153 is executed by the hardware thread 212a, the function of the code block 153c is called.

The code block 153b includes an equivalent function to the original function sub_child. The code block 153b includes a branch instruction indicating a conditional branch. In addition, the code block 153c includes an equivalent function to the original function sub_child, that is, an equivalent function to the code block 153b. The code block 153c includes the branch instruction indicating the conditional branch. Therefore, when the optimized code 153 is executed by the hardware threads 212 and 212a, the branch instructions at different instruction addresses are selectively executed by these hardware threads, but the same operation is performed by the hardware threads.

Compared with the optimized codes 151 and 152, in the optimized code 153, the code block 153a that is to determine what to call according to the thread ID of an executing hardware thread is outside the loop i. This further reduces the number of times a call destination is determined according to a thread ID. In the case where the execution cost of the if-else sentence occupies most of the execution cost of the function sub_child, such an extension of the portion to be replicated reduces overhead of the replication and improves the execution efficiency of the object code.

In the compiler apparatus 100 of the second embodiment, in the branch prediction optimization, an instruction group including a branch instruction is copied, and object code that allows a different instruction group to be selectively executed according to a thread ID is generated. Therefore, even when the same object code is executed in parallel by the hardware threads 212 and 212a that share the branch prediction unit 216, these hardware threads execute branch instructions at different instruction addresses. Therefore, without the need of replacing the branch prediction unit 216, it is possible to reduce the probability of writing the histories about the branch directions obtained by the hardware threads 212 and 212a to the same entry of the history table 218. This makes it possible to perform branch prediction for the hardware threads 212 and 212a separately, thus increasing the prediction accuracy.

Further, execution information representing execution of object code prior to branch prediction optimization is collected, and branch instructions to be subjected to optimization are selected based on the execution information. This reduces the size of the object code, as compared with the case of copying all instruction groups that include branch instructions. In addition, a portion of one set of instruction group to be copied is extended, where appropriate, based on the collected execution information. This makes it possible to reduce the overhead of selecting one of a plurality of instruction groups according to a hardware thread and to improve the execution efficiency of the generated object code.

In this connection, as described earlier, the information processing of the first embodiment is realized by the compiler apparatus 10 executing a program. The information processing of the second embodiment is realized by the compiler apparatus 100 executing a program.

The program is recorded on a computer-readable recording medium (for example, the recording medium 113). As the recording medium, for example, a magnetic disk, an optical disc, a magneto-optical disk, a semiconductor memory, or another may be used. The magnetic disks include flexible disks (FD) and HDDs. The optical discs include CDs, CD-Rs (Recordable), CD-RWs (Rewritable), DVDs, DVD-Rs, and DVD-RWs. The program may be recorded on portable recording media, which are then distributed. In this case, the program may be copied (installed) from a portable recording medium to another recording medium such as an HDD (for example, HDD 103), and then be executed.

According to one aspect, it is possible to increase branch prediction accuracy of a processor that is able to execute a plurality of threads.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program, the computer program causing a computer to perform a process comprising:
   when generating object code by compiling source code, copying a branch instruction indicated by the source code to produce a plurality of branch instructions;
   generating a control instruction to cause different threads running on a processor to execute different branch instructions of the plurality of branch instructions, the processor being able to execute a plurality of threads that share storage space for storing information to be used for branch prediction; and
   inserting the plurality of branch instructions and the control instruction into the object code.

2. The non-transitory computer-readable storage medium according to claim 1, wherein the process further includes:
   obtaining execution information indicating an execution status of each branch instruction indicated by the source code, the execution information being generated by causing the processor to execute processing according to the source code; and
   selecting the branch instruction from branch instructions indicated by the source code based on the execution information.

3. The non-transitory computer-readable storage medium according to claim 2, wherein:
   the execution information includes misprediction information indicating a failure in branch prediction made by the processor, with respect to each branch instruction indicated by the source code; and
   the selecting includes selecting the branch instruction based on the misprediction information.

4. The non-transitory computer-readable storage medium according to claim 1, wherein the process further includes:
   obtaining execution information indicating an execution status of instructions indicated by the source code, the execution information being generated by causing the processor to execute processing according to the source code; and
   selecting an instruction group including the branch instruction from instructions indicated by the source code based on the execution information, and copying the instruction group.

5. A compile method, comprising:
   when generating object code by compiling source code, copying, by a processor, a branch instruction indicated by the source code to produce a plurality of branch instructions;
   generating, by the processor, a control instruction to cause different threads running on another processor to execute different branch instructions of the plurality of branch instructions, said another processor being able to execute a plurality of threads that share storage space for storing information to be used for branch prediction; and
   inserting, by the processor, the plurality of branch instructions and the control instruction into the object code.

6. A compiler apparatus comprising:
   a memory configured to store source code; and
   a processor configured to perform a process including:
     when generating object code by compiling the source code,
     copying a branch instruction indicated by the source code to produce a plurality of branch instructions;
     generating a control instruction to cause different threads running on another processor to execute different branch instructions of the plurality of branch instructions, said another processor being able to execute a plurality of threads that share storage space for storing information to be used for branch prediction; and
     inserting the plurality of branch instructions and the control instruction into the object code.

* * * * *